(12) United States Patent
Yang et al.

(10) Patent No.: US 12,471,135 B2
(45) Date of Patent: *Nov. 11, 2025

(54) COMMUNICATION METHOD AND APPARATUS

(71) Applicant: Huawei Technologies Co., Ltd., Shenzhen (CN)

(72) Inventors: Mao Yang, Xi'an (CN); Bo Li, Xi'an (CN); Yunbo Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/752,175

(22) Filed: Jun. 24, 2024

(65) Prior Publication Data

US 2024/0349331 A1 Oct. 17, 2024

Related U.S. Application Data

(63) Continuation of application No. 17/646,955, filed on Jan. 4, 2022, now Pat. No. 12,058,731, which is a continuation of application No. PCT/CN2020/100211, filed on Jul. 3, 2020.

(30) Foreign Application Priority Data

Jul. 5, 2019 (CN) .......................... 201910606607.7

(51) Int. Cl.
*H04W 74/04* (2009.01)
*H04W 72/12* (2023.01)
*H04W 80/02* (2009.01)

(52) U.S. Cl.
CPC ........... *H04W 74/04* (2013.01); *H04W 72/12* (2013.01); *H04W 80/02* (2013.01)

(58) Field of Classification Search
CPC ...... H04W 74/04; H04W 72/12; H04W 80/02
See application file for complete search history.

(56) References Cited

U.S. PATENT DOCUMENTS

2010/0190520 A1\* 7/2010 Reumerman ......... H04L 1/0001
455/63.1
2019/0075562 A1\* 3/2019 Cariou ................ H04W 74/002
(Continued)

FOREIGN PATENT DOCUMENTS

CN 110519862 A 11/2019
JP 2018011251 A 1/2018
(Continued)

OTHER PUBLICATIONS

Chu, L. et al., "Multiple Band Operation Discussion", IEEE 802.11-19/0821r0, May 14, 2019, 7 pages.
(Continued)

*Primary Examiner* — Saad A. Waqas
(74) *Attorney, Agent, or Firm* — Slater Matsil, LLP

(57) ABSTRACT

A ML entity performs a backoff procedure of the primary link based on the backoff counter of the primary link; and when a count value of the backoff counter is 0, the ML entity sends a first PPDU on each first link in K first links, where the K first links include the primary link and K−1 first nonprimary links, and the first nonprimary link is in an idle state in a first inter-frame space before a time point at which the count value of the backoff counter decreases to 0.

11 Claims, 10 Drawing Sheets

(56) References Cited

U.S. PATENT DOCUMENTS

2019/0150214 A1 5/2019 Zhou et al.
2019/0158413 A1* 5/2019 Patil ................. H04W 28/0838

FOREIGN PATENT DOCUMENTS

WO    WO-2017025065 A1 *  2/2017  ............ H04W 74/08
WO        2017155359 A1    9/2017

OTHER PUBLICATIONS

Hwang, S. et al., "Consideration on Multi-link Operation", IEEE 802.11-19/1181r0, Jul. 15, 2019, 13 pages.
IEEE Standards Association, IEEE Standard for Information technology-Telecommunications and information exchange between systems Local and metropolitan area networks-Specific requirements, Part 11: Wireless LAN Medium Access Control (MAC) and Physical Layer (PHY) Specifications, IEEE Std 802.11•-2016, Dec. 7, 2016, 3534 pages.
Patil, A. et al., "Multi-Link Aggregation: Gain Analysis", IEEE 802.11-19/0764r0, May 2, 2019, 11 pages.
Patil, A. et al., "Multi-Link Aggregation: Peak Throughput Gains", IEEE 802.11-19/0764r1, May 2, 2019, 12 pages.
Patil, A. et al., "Multi-Link Operation: Design Discussion", IEEE 802.11-19/0823r0, May 2, 2019, 11 pages.
Seok, Y. et al. "EHT Multi-link Operation", IEEE 802.11-19/0731r0, May 15, 2019, 17 pages.

* cited by examiner

| L-STF | L-LTF | L-SIG | RL-SIG | HE-SIG-A | HE-STF | HE-LTF | ... | HE-LTF | DATA | PE |

FIG. 2

COMMUNICATION METHOD AND APPARATUS

CROSS-REFERENCE TO RELATED APPLICATIONS

This application is a continuation of U.S. patent application Ser. No. 17/646,955, filed on Jan. 4, 2022, which is a continuation of International Application No. PCT/CN2020/100211, filed on Jul. 3, 2020, which claims priority to Chinese Patent Application No. 201910606607.7, filed on Jul. 5, 2019. All of the afore-mentioned patent applications are hereby incorporated by reference in their entireties.

TECHNICAL FIELD

This application relates to the field of communication technologies, and in particular, to a communication method and an apparatus.

BACKGROUND

To achieve a technical goal of extremely high throughput, the standard of Institute of Electrical and Electronics Engineers (IEEE) 802.11be includes multi-link (ML) as one of its key technologies. An ML entity supporting an ML technology has a capability of sending and receiving over a plurality of frequency bands, so that the ML entity can use a larger bandwidth to perform data transmission. This significantly improves a throughput rate. A spatial path through which the ML entity performs data transmission over a frequency band may be referred to as a link.

Currently, for any link in a plurality of links supported by the ML entity, the ML entity may have two channel access manners on the link. Manner 1: When a count value of a backoff counter of the link decreases to 0, the ML entity may perform channel access on the link. Manner 2: When a backoff counter of another link decreases to 0, if the link is in an idle state in a previous PIFS, the ML entity may perform channel access on the link.

Because a single link (SL) entity supports data transmission only on one link, only when a count value of a backoff counter of a link supported by the SL entity decreases to 0, can the SL entity perform channel access on the link.

Therefore, for one link, a possibility that an ML entity obtains a channel through contention is greater than a possibility that an SL entity obtains a channel through contention. In other words, when both an ML entity and an SL entity are deployed in a WLAN, the SL entity is at a disadvantage in channel contention. This affects proper communication of the SL entity.

SUMMARY

This application provides a communication method and an apparatus, to ensure fairness for an SL entity in channel contention.

According to a first aspect, a communication method is provided. The method is applied to an ML entity, the ML entity supports a primary link and at least one nonprimary link, a backoff counter is disposed on the primary link, and no backoff counter is disposed on the nonprimary link. The method includes: The ML entity performs a backoff procedure of the primary link based on the backoff counter; and when a count value of the backoff counter decreases to 0, the ML entity sends a first physical layer protocol data unit (PPDU) on each first link in K first links, where the K first links include the primary link and K−1 first nonprimary links, the first nonprimary link is in an idle state in a first inter-frame space before a time point at which the count value of the backoff counter decreases to 0, and K is a positive integer.

According to the foregoing technical solution, because the ML entity sets the backoff counter only on the primary link, when performing channel access, the ML entity performs the backoff procedure only on the primary link. In this way, the ML entity cannot obtain a channel through contention before the backoff procedure of the primary link ends. This ensures that a probability of obtaining a channel through contention on the primary link by the ML entity is equal to a probability of obtaining a channel through contention on a supported link of an SL entity by the SL entity. Therefore, the technical solutions provided in this application can ensure fairness for the SL entity in channel contention, and therefore ensures proper communication of the SL entity.

In addition, according to the foregoing technical solution, when the supported link of the SL entity and the primary link of the ML entity are a same link, the SL entity and the ML entity actually perform channel contention on the same link. In this way, when the ML entity successfully obtains the channel through contention on the primary link, the SL entity does not send a PPDU on the primary link. This ensures synchronization in receiving and sending performed by the ML entity on a plurality of links. For example, link #1 is used as a primary link. When a count value of a backoff counter of an ML AP entity on link #1 is 0, the ML AP entity sends a PPDU on link #1 and link #2. An SL entity does not send a PPDU to the ML AP entity on link #1. Therefore, the ML AP entity can synchronously receive signals, or synchronously send signals on link #1 and link #2.

In a possible design, that the ML entity sends a first PPDU on each first link in K first links includes: The ML entity sends the first PPDU on an available channel of each first link in the K first links, where an available channel of the primary link includes a primary channel of the primary link, and an available channel of the first nonprimary link includes a primary channel of the first nonprimary link.

In a possible design, that the ML entity performs a backoff procedure of the primary link based on the backoff counter includes: The ML entity waits for an idle period of the primary channel of the primary link to reach a second inter-frame space; after the idle period of the primary channel of the primary link reaches the second inter-frame space, each time the primary channel of the primary link is in an idle state in one timeslot, the ML entity decreases the count value of the backoff counter by 1; and when the count value of the backoff counter decreases to 0, the ML entity ends the backoff procedure of the primary link.

In a possible design, that the first nonprimary link is in an idle state in the first inter-frame space before an end time point of the backoff procedure of the primary link includes: The primary channel of the first nonprimary link is in the idle state in the first inter-frame space before a time point at which the count value of the backoff counter decreases to 0.

In a possible design, the primary channel of the first nonprimary link is a subchannel with a lowest frequency, 20 MHz, in a frequency band corresponding to the first nonprimary link. Alternatively, the primary channel of the first nonprimary link is a subchannel with a highest frequency, 20 MHz, in a frequency band corresponding to the first nonprimary link. In other words, the primary channel of the first nonprimary link is implicitly configured. This helps reduce signaling overheads.

In a possible design, the first PPDU includes a first-type media access control (MAC) frame, where the first-type MAC frame does not need a response.

In a possible design, the first PPDU includes a second-type MAC frame, where the second-type MAC frame needs a response. The method further includes: The ML entity receives a response frame for the second-type MAC frame on one or more first links; and if the one or more first links do not include the primary link, the ML entity determines that establishing of a transmission opportunity (TXOP) fails; or if the one or more first links include the primary link, the ML entity determines that establishing of a TXOP succeeds.

In a possible design, the method further includes: The ML entity determines N second links corresponding to the TXOP, where the N second links include the primary link and N−1 second nonprimary links, the second nonprimary link is a first nonprimary link that meets a preset condition, where the preset condition includes: On the first nonprimary link, the ML entity sends the first PPDU including the first-type MAC frame, or on the first nonprimary link, the ML entity sends the first PPDU including the second-type MAC frame, and receives the response frame for the second-type MAC frame. The ML entity sends a second PPDU on each second link in the N second links.

In a possible design, the method further includes: If transmission of the second PPDU fails on one or more second nonprimary links, the ML entity stops sending the second PPDU on a second link on which the transmission of the second PPDU fails, and continues to send, until the TXOP ends, the second PPDU on a second link on which the transmission of the second PPDU succeeds.

In a possible design, the method further includes: If transmission of the second PPDU fails on one or more second links, the ML entity stops sending the second PPDU on the N second links; the ML entity waits for an idle period of the primary link to reach the first inter-frame space; after the idle period of the primary link reaches the first inter-frame space, the ML entity sends the second PPDU on each third link in P third links, where the P third links include the primary link and P−1 third nonprimary links, the third nonprimary link is a second nonprimary link that is in the idle state in the first inter-frame space before a first time point, the first time point is a time point at which the idle period of the primary link reaches the first inter-frame space, and P is a positive integer less than or equal to N.

In a possible design, the method further includes: If transmission of the second PPDU fails on one or more second links, the ML entity stops sending the second PPDU on the N second links; the ML entity performs the backoff procedure on the primary link; after the backoff procedure of the primary link ends, the ML entity sends the second PPDU on each third link in P third links, where the P third links include the primary link and P−1 third nonprimary links, the third nonprimary link is a second nonprimary link that is in the idle state in the first inter-frame space before the end time point of the backoff procedure of the primary link, and P is a positive integer less than or equal to N.

According to a second aspect, a communication method is provided. The method is applied to an ML entity, and the ML entity supports K first links. The method includes: The ML entity performs a backoff procedure on each first link in the K first links, where K is a positive integer greater than or equal to 2; when a backoff procedure of a target link ends, the ML entity sends a first PPDU on each second link in N second links, where the second link is a first link that is in an idle state in a first inter-frame space before an end time point of the backoff procedure of the target link, the target link is a first link whose backoff procedure ends first in the K first links, and N is a positive integer less than or equal to K; and if transmission of the first PPDU fails on one or more second links, the ML entity does not send, within a preset time period, a second PPDU on the second link on which the transmission of the first PPDU fails, or the ML entity does not send a second PPDU on the N second links within a preset time period.

According to the foregoing technical solution, if the ML entity fails to transmit the first PPDU on the one or more second links, the ML entity is prohibited from sending, within the preset time period, the second PPDU on the second link on which the transmission of the PPDU fails; or the ML entity is prohibited from sending the second PPDU on the N second links within the preset time period. In this way, the ML entity cannot use a plurality of links within the preset time period. If one link that the ML entity cannot use and that is in the plurality of links is supported by an SL entity, within the preset time period, because the ML entity cannot perform channel contention on the link supported by the SL entity, a probability that the SL entity obtains a channel through contention increases. This ensures fairness for the SL entity in channel contention, and therefore ensures proper communication of the SL entity.

According to a third aspect, a communication method is provided. The method is applied to an ML entity, and the ML entity supports K first links. The method includes: The ML entity performs a backoff procedure on each first link in the K first links, where K is a positive integer greater than or equal to 2; and the ML entity sends a first PPDU on each second link in N second links, where the second link is a first link whose backoff procedure has ended and that is in an idle state in a first inter-frame space before a first time point, and N is a positive integer less than or equal to M.

According to the foregoing technical solution, although the ML performs the backoff procedure on all the K first links, the second link used to send the first PPDU needs to satisfy a condition that the backoff procedure of the second link has ended. In other words, on one link, the ML entity may obtain a channel through contention only after the ML entity ends a backoff procedure on the link. Compared with the conventional technology in which an ML entity can obtain a channel through contention on one link even if a backoff procedure on the link has not ended, the technical solution in this application reduces a probability that an ML entity obtains a channel through contention on one link. This ensures fairness for an SL entity in channel contention, and therefore ensures proper communication of the SL entity.

In a possible design, the first time point is an end time point of a backoff procedure of a target link, and the target link is a second link whose backoff procedure ends last in the N second links.

According to a fourth aspect, a communication method is provided. The method is applied to an ML entity, and the ML entity supports K first links. The method includes: The ML entity performs a backoff procedure on each first link in K first links, where K is a positive integer greater than or equal to 2; and when a sum of count values of backoff counters of the K first links is less than or equal to 0, or a sum of count values of backoff counters of N second links is less than or equal to 0, the ML entity sends a first PPDU on each second link in the N second links, where the second link is a first link that is in an idle state in a second inter-frame space before a current time point, and N is a positive integer less than or equal to M.

According to the foregoing technical solution, although the ML entity performs the backoff procedure on each first link in the K first links, the ML entity may successfully obtain the channel through contention only when the sum of the count values of the backoff counters of the K first links is less than or equal to 0 or the sum of the count values of the backoff counters of the N second links is less than or equal to 0. In other words, for the ML entity, count values of backoff counters of one or more first links need to be less than 0. This requires that one or more first links be idle for a relatively long time. In this way, a probability that the ML entity obtains a channel through contention is reduced. That the probability that the ML entity obtains a channel through contention is reduced weakens an advantage of the ML entity over an SL entity in channel contention, ensures fairness for the SL entity in channel contention, and therefore ensures proper communication of the SL entity.

In a possible design, that the ML entity performs a backoff procedure on each first link in K first links includes: for each first link in the K first links, the ML entity waits for an idle period of the first link to reach the second inter-frame space; and after the idle period of the first link reaches the second inter-frame space, each time the first link is in an idle state in one timeslot, the ML entity decreases a count value of a backoff counter of the first link by 1.

In a possible design, the count value of the backoff counter of the first link includes negative integers.

In a possible design, the method further includes: for each first link in the K first links, after an idle period of the first link reaches the second inter-frame space, each time the first link is in an idle state in one timeslot, the ML entity decreases a count value of a target counter by 1, where the target counter is configured to record the sum of the count values of the backoff counters of the K first links. In this way, the ML entity may directly learn of the sum of the count values of the backoff counters of the K first links by using the target counter.

According to a fifth aspect, a communication method is provided. The method is applied to an ML entity, the ML entity supports a plurality of links, and the plurality of links each serve as a first link in turn according to a preset cyclic order. The method includes: The ML entity performs a backoff procedure on the first link; and after the backoff procedure of the first link ends, the ML entity sends a first PPDU on each second link in N second links, where the N second links include the first link and N−1 available links, the available link is in an idle state in a first inter-frame space before an end time point of the backoff procedure of the first link, and N is a positive integer.

According to the foregoing technical solution, each time channel access is performed, the ML entity performs a backoff procedure only on a first link. In other words, the ML entity performs channel contention on only one link. A probability that the ML entity obtains a channel through contention on one link is equal to a probability that an SL entity obtains a channel through contention on one link. In this way, fairness for the SL entity in channel contention is ensured, and therefore proper communication of the SL entity is ensured.

According to a sixth aspect, an ML entity is provided. The ML entity may include a module configured to perform the method/operation/step/action described in any design in the first aspect to the fifth aspect in a one-to-one correspondence. The foregoing module may be a hardware circuit, or software, or may be implemented by using a hardware circuit in combination with software.

According to a seventh aspect, an ML entity is provided. The ML entity includes a processor and a transceiver, and the processor is configured to perform a processing operation in the communication method according to any design in the first aspect to the fifth aspect. The transceiver is configured to be controlled by the processor to perform a sending and receiving operation in the communication method according to any design in the first aspect to the fifth aspect.

According to an eighth aspect, a computer-readable storage medium is provided. The computer-readable storage medium is configured to store instructions. When the instructions are read by a computer, the computer is configured to perform the communication method according to any design in the first aspect to the fifth aspect.

According to a ninth aspect, a computer program product is provided. The computer program product includes instructions. When the computer reads the instructions, the computer performs the communication method according to any possible design in the first aspect to the fourth aspect.

According to a tenth aspect, a chip is provided. The chip includes a processing circuit and a transceiver pin. The chip supports a primary link and at least one nonprimary link. A backoff counter is disposed on the primary link, and no backoff counter is disposed on the nonprimary link. The processing circuit is configured to perform a backoff procedure of the primary link based on the backoff counter. The transceiver pin is configured to: when a count value of the backoff counter decreases to 0, send a first PPDU on each first link in K first links, where the K first links include the primary link and K−1 first nonprimary links, the first nonprimary link is in an idle state in a first inter-frame space before a time point at which the count value of the backoff counter decreases to 0, and K is a positive integer.

According to an eleventh aspect, a chip is provided. The chip includes a processing circuit and a transceiver pin. The chip supports K first links. The processing circuit is configured to perform a backoff procedure on each first link in the K first links, where K is a positive integer greater than or equal to 2. The transceiver pin is configured to: when a backoff procedure of a target link ends, send a first PPDU on each second link in N second links, where the second link is a first link that is in an idle state in a first inter-frame space before an end time point of the backoff procedure of the target link, the target link is a first link whose backoff procedure ends first in the K first links, and N is a positive integer less than or equal to K. The transceiver pin is further configured to: if transmission of the first PPDU fails on one or more second links, skip sending, within a preset time period, a second PPDU on the second link on which the transmission of the first PPDU fails, or skip sending a second PPDU on the N second links within a preset time period.

According to a twelfth aspect, a chip is provided. The chip includes a processing circuit and a transceiver pin. The chip supports K first links. The processing circuit is configured to perform a backoff procedure on each first link in the K first links, where K is a positive integer greater than or equal to 2. The transceiver pin is configured to send a first PPDU on each second link in N second links, where the second link is a first link whose backoff procedure has ended and that is in an idle state in a first inter-frame space before a first time point, and N is a positive integer less than or equal to M.

According to a thirteenth aspect, a chip is provided. The chip includes a processing circuit and a transceiver pin. The chip supports K first links. The processing circuit is configured to perform a backoff procedure on each first link in the K first links, where K is a positive integer greater than or equal to 2. The transceiver pin is configured to: when a sum of count values of backoff counters of the K first links is less than or equal to 0, or a sum of count values of backoff counters of N second links is less than or equal to 0, send a first PPDU on each second link in the N second links, where the second link is a first link that is in an idle state in a second inter-frame space before a current time point, and N is a positive integer less than or equal to M.

According to a fourteenth aspect, a chip is provided. The chip includes a processing circuit and a transceiver pin. The chip supports a plurality of links, and the plurality of links each serve as a first link in turn according to a preset cyclic order. The processing circuit is configured to perform a backoff procedure on the first link. The transceiver pin is configured to: after the backoff procedure of the first link ends, send a first PPDU on each second link in N second links, where the N second links include the first link and N−1 available links, the available link is in an idle state in a first inter-frame space before an end time point of the backoff procedure of the first link, and N is a positive integer.

For technical effects brought by any design in the sixth aspect to the fourteenth aspect, refer to beneficial effects in the corresponding method provided above. Details are not described herein again.

BRIEF DESCRIPTION OF THE DRAWINGS

FIG. 2 is a schematic diagram of a frame structure of a PPDU according to an embodiment of this application;

DETAILED DESCRIPTION OF ILLUSTRATIVE EMBODIMENTS

Figure 1:
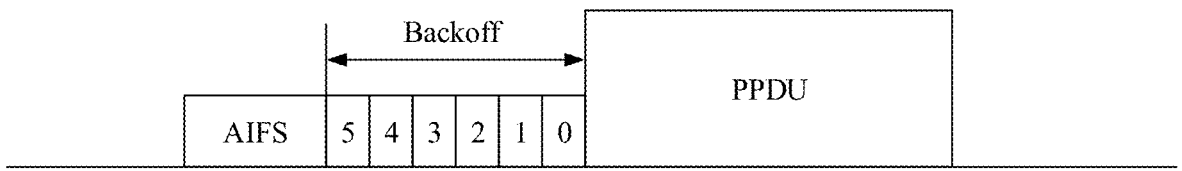
FIG. 1 is a schematic diagram of a backoff procedure according to an embodiment of this application.

In descriptions of this application, unless otherwise specified, "/" means "or". For example, A/B may represent A or B. "And/or" in this specification describes an association relationship for describing associated objects and represents that there may be three relationships. For example, A and/or B may represent the following three cases: Only A exists, both A and B exist, and only B exists. In addition, "at least one" means one or more, and "a plurality of" means two or more. Terms such as "first" and "second" do not limit a quantity and an execution sequence, and terms such as "first" and "second" do not indicate a definite difference.

It should be noted that, in this application, terms such as "example" or "for example" are used to represent giving an example, an illustration, or descriptions. Any embodiment or design scheme described as an "example" or "for example" in this application should not be explained as being more preferred or having more advantages than another embodiment or design scheme. Specifically, use of "example" and "for example" is intended to present a relative concept in a specific manner.

For ease of understanding, the following first briefly describes some technical terms in embodiments of this application.

1. Basic Service Set (BSS)

The BSS is used to describe a group of devices that can communicate with each other in a wireless local area network (WLAN). The WLAN may include a plurality of BSSs. Each BSS has a unique identifier. The unique identifier is referred to as a basic service set identifier (BSSID).

One BSS may include a plurality of stations (STAs). The station may be an access point (AP) or a non-access point station (non-AP STA). Optionally, one BSS may include one AP and a plurality of non-AP STAs associated with the AP.

The AP is also referred to as a wireless access point or a hotspot. The AP may be a wireless router, a wireless transceiver, a wireless switch, or the like.

The non-AP STA may have different names such as a subscriber unit, an access terminal, a mobile station, a mobile device, a terminal, and user equipment. In an actual application, the non-AP STA may be a cellular phone, a smartphone, a wireless local loop (WLL), and another handheld device or computer device that has a wireless local area network communication function.

2. Backoff Mechanism

An IEEE 802.11 standard allows a plurality of users to share a same transmission medium. A transmitter checks availability of the transmission medium before sending data. The IEEE 802.11 standard uses carrier sense multiple access with collision avoidance (CSMA/CA) to implement channel contention. To avoid collision, the CSMA/CA adopts a backoff mechanism.

The backoff mechanism on a single channel is described below. Before a device sends a message, the device may select a random number from 0 to a contention window (CW), and use the random number as an initial value of a backoff counter. After an idle period of the channel reaches an arbitration inter-frame space (AIFS), a count value of the backoff counter decreases by 1 each time the channel is idle in a timeslot. Before the count value of the backoff counter decreases to 0, if the channel is busy in one timeslot, the backoff counter stops counting. Then, if the channel changes from busy to idle in state and the idle period of the channel reaches the AIFS, the backoff counter resumes counting. When the count value of the backoff counter is 0, the backoff procedure ends, and the device may start data transmission.

An example is provided for description with reference to FIG. 1, it is assumed that an initial value of a backoff counter is 5, and after an idle period of a channel reaches an AIFS, the backoff counter starts to perform a backoff. Each time the channel is in an idle state in one timeslot, a count value of the backoff counter decreases by 1 until the count value of the backoff counter is 0. After the count value of the backoff counter is 0, the device successfully obtains a channel through contention, and the device may send a PPDU on the channel.

3. PPDU

FIG. 2 is a schematic diagram of a frame structure of a PPDU in an 802.11ax standard. The PPDU includes a legacy-short training field (L-STF), a legacy-long training field (L-LTF), a legacy-signal field (L-SIG), a repeated legacy signaling field (RL-SIG), a high efficiency signal field A (HE-SIG A), a high efficiency signal field B (HE-SIG B), a high efficiency-short training field (HE-STF), and a high efficiency-long training field (HE-LTF), a data field, and a packet extension (PE) field.

4. TXOP

A TXOP is a basic unit in wireless channel access. The TXOP consists of an initial time point and maximum duration a TXOP limit. Within the TXOP limit, a station that obtains the TXOP may not perform channel contention repeatedly, and continuously use a channel to transmit a plurality of data frames.

5. Request to Send (RTS)/Clear to Send (CTS) Mechanism

An RTS/CTS mechanism is used to resolve a problem of hidden stations, to avoid a signal conflict between a plurality of stations.

Before sending a data frame, a transmit end first sends an RTS frame in a broadcast manner, to indicate that the transmit end is to send a data frame to a specified receive end within specified duration. After receiving the RTS frame, the receive end sends a CTS frame in a broadcast manner to acknowledge transmission performed by the transmit end. Another station that receives the RTS frame or the CTS frame do not send a radio frame until the specified duration ends.

6. ML Entity

An ML entity has a capability of sending and receiving over a plurality of frequency bands. For example, the plurality of frequency bands include but are not limited to a 2.4 GHz frequency band, a 5 GHz frequency band, and a 6 GHz frequency band. A spatial path through which the ML entity performs data transmission over a frequency band may be referred to as a link. In other words, the ML entity supports multi-link communication.

It should be understood that, for the ML entity, each link supported by the ML entity corresponds to one frequency band.

The ML entity may also be referred to as an ML STA entity. The ML entity includes a plurality of STAs. The plurality of STAs in the ML entity may have a same MAC address, or may have different MAC addresses. The plurality of STAs in the ML entity may be located at a same physical location, or may be located at different physical locations.

Figure 3:
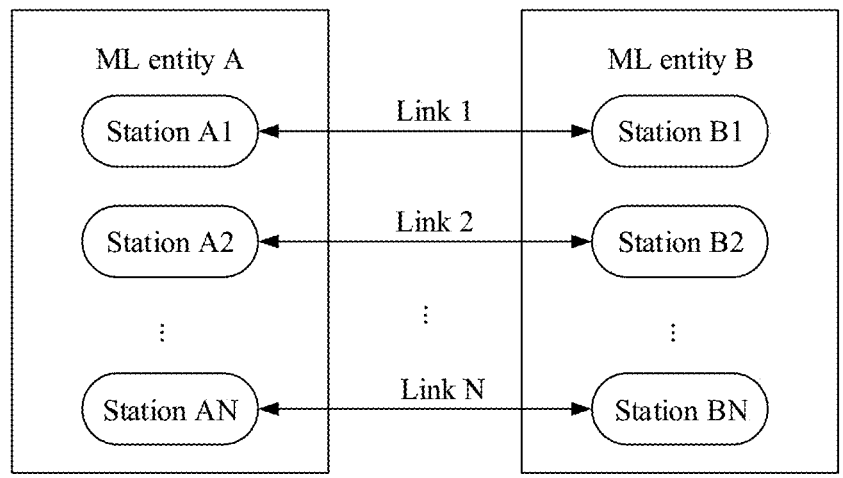
FIG. 3 is a schematic diagram of an ML communication scenario according to an embodiment of this application.

Each STA in the ML entity may establish a link for communication. As shown in FIG. 3, ML entity A includes station A1 to station AN, and ML entity B includes station B1 to station BN. Station A1 communicates with station B1 through link 1, station A2 communicates with station B2 through link 2, and by analogy, station AN communicates with station BN through link N.

Figure 4:
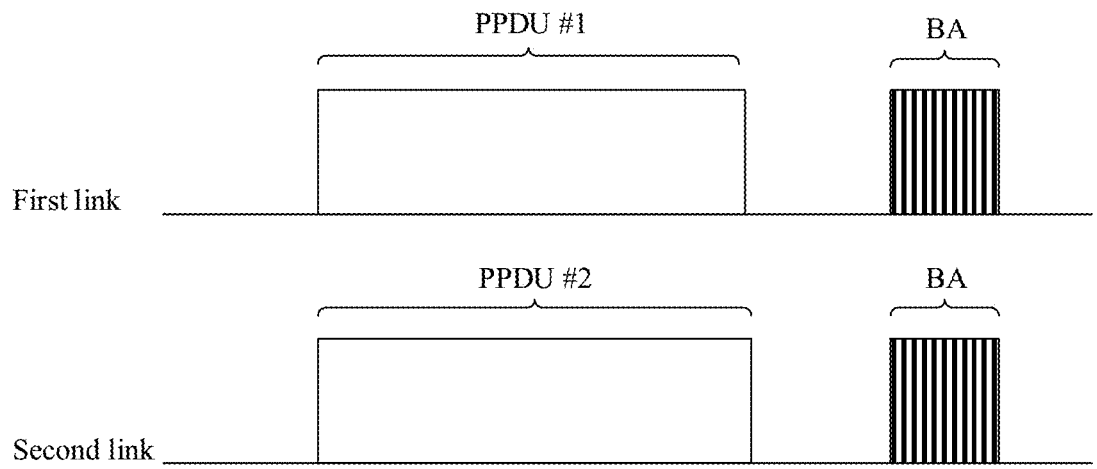
FIG. 4 is a schematic diagram of another ML communication scenario according to an embodiment of this application.

When a frequency spacing between the plurality of frequency bands supported by the ML entity is small, sending of a signal over one frequency band by the ML entity severely affects receiving of a signal over another frequency band. Therefore, to ensure proper communication, when the ML entity performs communication through a plurality of links at a same time, the ML entity needs to receive signals on the plurality of links at a same time, or send signals on the plurality of links at a same time. In FIG. 4, ML entity A sends PPDUs on a first link and a second link at a same time. Then, ML entity A receives block acknowledgment (block ack, BA) frames fed back by ML entity B on the first link and the second link at a same time.

In this embodiment of this application, PPDUs sent by ML entity on different links may be the same or different.

In this embodiment of this application, when the ML entity performs communication through a plurality of links at a same time, traffic identifiers (TIDs) corresponding to the plurality of links may be the same or different.

If the STAs in the ML entity are APs, the ML entity may be referred to as an ML AP entity. If the STAs in the ML entity are non-AP STAs, the ML entity may be referred to as an ML non-AP STA entity or an ML non-AP entity. In this embodiment of this application, unless otherwise specified, the ML entity may be an ML AP entity, or may be an ML non-AP entity.

A non-AP STA that is in an ML non-AP entity and that is on a link may be associated with an AP that is in an ML AP entity and that is on the same link, so that the non-AP STA in the ML non-AP entity on the link can communicate with the AP in the ML AP entity on the same link.

It should be understood that an association relationship may be established between an ML AP entity and an ML non-AP entity, to ensure proper communication between the ML AP entity and the ML non-AP entity.

It should be noted that an association relationship between an ML AP entity and an ML non-AP entity includes: an association relationship between a station in the ML AP entity on a link and a station in the ML non-AP entity on the same link.

An implementation of establishing an association relationship between an ML non-AP entity and an ML AP entity is not limited in this embodiment of this application. For example, an ML non-AP entity and an ML AP entity establish on one link an association relationship of the link. Alternatively, an ML non-AP entity and an ML AP entity establish on one link an association relationship of a plurality of links between the ML non-AP entity and the ML AP entity.

For a specific implementation of establishing the association relationship of one link between the ML non-AP entity and the ML AP entity, refer to an implementation of establishing an association relationship between an AP and a non-AP STA in the conventional technology. Details are not described herein again.

7. SL Entity

An SL entity is a STA that supports only one link. The SL entity may be a legacy (legacy) STA, in other words, a STA that supports only an existing 802.11 standard but does not support a next-generation 802.11 standard.

The foregoing briefly describes the technical terms involved in this application, and details are not described again in the following.

Technical solutions in this application are applied to a WLAN. A standard used for the WLAN may be an IEEE 802.11 standard, for example, an 802.11ax standard or a next-generation 802.11 standard. Scenarios to which the technical solutions in this application are applicable include: a communication scenario between ML entities and a communication scenario between an ML entity and an SL entity.

For example, the communication scenario between the ML entities may be a communication scenario between an ML non-AP entity and an ML AP entity, a communication scenario between ML non-AP entities, or a communication scenario between ML AP entities.

For example, the communication scenario between the ML entity and the SL entity may be a communication scenario between an ML non-AP entity and a legacy AP, a communication scenario between an ML AP entity and a legacy non-AP STA, a communication scenario between an ML AP entity and a legacy AP, or a communication scenario between an ML non-AP entity and a legacy non-AP STA.

The following specifically describes the technical solutions provided in the embodiments of this application with reference to accompanying drawings of the specification.

Figure 5:
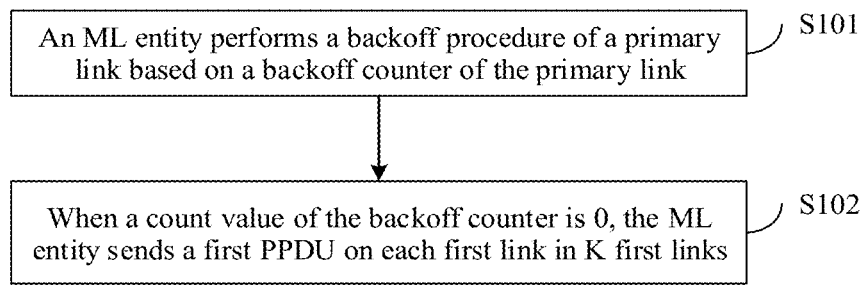
FIG. 5 is a flowchart of a communication method according to an embodiment of this application.

FIG. 5 shows a communication method according to an embodiment of this application. The method includes the following steps.

S101. An ML entity performs a backoff procedure of a primary link based on a backoff counter of the primary link.

The ML entity supports the primary link and at least one nonprimary link. The backoff counter is disposed on the primary link, and no backoff counter is disposed on the nonprimary link. It should be understood that, because the backoff counter is disposed only on the primary link, the ML entity can perform the backoff procedure only on the primary link.

It should be understood that, if the ML entity supports the primary link and at least one nonprimary link, the ML entity supports two channel access manners. One is a single-link channel access manner, in other words, the ML entity performs channel access only on the primary link. The other is a multi-link channel access manner, in other words, the ML entity performs channel access on the primary link and the nonprimary link. In an actual application, the ML entity may select a channel access manner based on a channel status, power, service load, and the like. For example, to save power, the ML entity uses the single-link channel access manner. Alternatively, to improve throughput, the ML entity uses the multi-link channel access manner. This embodiment of this application mainly describes the multi-link channel access manner.

Optionally, the primary link of the ML entity may be explicitly configured. It should be understood that explicitly configuring the primary link of the ML entity is flexible.

For example, the ML AP entity may send indication information to an ML non-AP entity associated with the ML AP entity, to indicate information about the primary link. The information about the primary link may include an identifier/index of the primary link, a frequency band corresponding to the primary link, and the like.

Optionally, the primary link of the ML entity may be implicitly configured. It should be understood that implicitly configuring the primary link of the ML entity helps reduce signaling overheads.

For example, a protocol may define a link corresponding to a specific frequency band as a primary link. For example, a protocol defines a link corresponding to a 2.4 GHz frequency band as the primary link.

For example, a protocol may define: In a plurality of links supported by an ML entity, a link corresponding to a frequency band with a lowest frequency is the primary link, or a link corresponding to a frequency band with a highest frequency is the primary link. For example, the ML entity supports a 2.4 GHz frequency band, a 5 GHz frequency band, and a 6 GHz frequency band. When the link corresponding to the frequency band with the lowest frequency is used as the primary link, the ML entity uses a link corresponding to the 2.4 GHz frequency band as the primary link. When the link corresponding to the frequency band with the highest frequency is used as the primary link, the ML entity uses a link corresponding to the 6 GHz frequency band as the primary link.

In this embodiment of this application, in one BSS, a primary link of an ML AP entity, a primary link of an SL entity, and a primary link of an ML non-SP entity are the same.

It may be understood that, for the ML entity, all links except the primary link in the plurality of links supported by the ML entity are nonprimary links.

In an implementation, the ML entity waits for an idle period of a primary channel of the primary link to reach a second inter-frame space. After the idle period of the primary channel of the primary link reaches the second inter-frame space, each time the primary channel of the primary link is in an idle state in one timeslot, the ML entity decreases a count value of the backoff counter by 1. When the count value of the backoff counter is 0, the ML entity ends the backoff procedure of the primary link.

It should be noted that, if the primary channel of the primary link is in a busy state in one timeslot, the ML entity freezes the backoff counter until the idle period of the primary channel reaches the second inter-frame space again.

Optionally, the second inter-frame space may be an AIFS. This is not limited in this embodiment of this application.

Optionally, the primary channel may be a primary channel of 20 MHz. This is not limited in this embodiment of this application.

Optionally, the primary channel of the primary link may be explicitly configured. It should be understood that explicitly configuring the primary channel of the primary link is flexible.

For example, the ML entity may receive a MAC frame from another device, where the MAC frame is used to indicate a frequency domain location of the primary channel of the primary link in a frequency band corresponding to the primary link. Optionally, the MAC frame may be a management frame such as a beacon frame or an association response frame.

Optionally, the primary channel of the primary link may be implicitly configured. It should be understood that implicitly configuring the primary channel of the primary link helps reduce signaling overheads.

For example, a preset frequency domain location of the primary channel of the primary link in a frequency band corresponding to the primary link may be defined in a protocol. In an example, a subchannel with a highest frequency of 20 MHz in the frequency band corresponding to the primary link is used as the primary channel. In another example, a subchannel with a lowest frequency of 20 MHz in the frequency band corresponding to the primary link is used as the primary channel.

S102. When the count value of the backoff counter is 0, the ML entity sends a first PPDU on each first link in K first links.

The K first links include the primary link and K−1 first nonprimary links, and K is a positive integer.

In this embodiment of this application, the first nonprimary link is in the idle state in a first inter-frame space before a time point at which the count value of the backoff counter decreases to 0. It should be understood that the time point at which the count value of the backoff counter of the primary link decreases to 0 is equivalent to an end time point of the backoff procedure of the primary link.

In other words, for any nonprimary link, if the nonprimary link is in the idle state in the first inter-frame space before the end time point of the backoff procedure of the primary link, the nonprimary link is the first nonprimary link. Otherwise, the nonprimary link is not the first nonprimary link. Optionally, the first inter-frame space is a PIFS. This is not limited in this embodiment of this application.

Optionally, a busy/idle state of the nonprimary link may be determined based on a busy/idle state of a primary channel of the nonprimary link. In other words, if the primary channel of the nonprimary link is in the busy state, it indicates that the nonprimary link is in the busy state. If the primary channel of the nonprimary link is in the idle state, it indicates that the nonprimary link is in the idle state.

Optionally, the primary channel of the nonprimary link is a primary channel of 20 MHz. This is not limited in this embodiment of this application.

It should be understood that, when the busy/idle state of the nonprimary link is determined based on the busy/idle state of the primary channel of the nonprimary link, the primary channel of the first nonprimary link is in the idle state in the first inter-frame space before the time point at which the count value of the backoff counter decreases to 0.

Optionally, the primary channel of the nonprimary link may be explicitly configured. It should be understood that explicitly configuring the primary channel of the nonprimary link is flexible.

For example, the ML entity may receive a MAC frame from another device, where the MAC frame is used to indicate a frequency domain location of the primary channel of the nonprimary link in a frequency band corresponding to the nonprimary link. Optionally, the MAC frame may be a management frame such as a beacon frame or an association response frame.

Optionally, the primary channel of the nonprimary link may be implicitly configured. It should be understood that implicitly configuring the primary channel of the nonprimary link helps reduce signaling overheads.

For example, a preset frequency domain location of the primary channel of the nonprimary link in a frequency band corresponding to the nonprimary link may be defined in a protocol. In an example, a subchannel with a highest frequency of 20 MHz in the frequency band corresponding to the nonprimary link is used as the primary channel of the nonprimary link. In another example, a subchannel with a lowest frequency of 20 MHz in the frequency band corresponding to the nonprimary link is used as the primary channel of the nonprimary link.

In an optional implementation, the ML entity sends a first PPDU on a first available channel of each first link in the K first links. A first available channel of the primary link includes the primary channel of the primary link. A first available channel of the first nonprimary link includes the primary channel of the first nonprimary link.

To be specific, for each first link in the K first links, before sending the first PPDU, the ML entity determines first available bandwidth of the first link based on an idle/busy state of each subchannel in a frequency band corresponding to the first link and a bandwidth requirement of the ML entity, so that bandwidth resources of the first link are fully used.

It should be noted that the first PPDU is an initial PPDU sent by the ML entity on the first link. The first PPDU may be used to establish a TXOP.

It should be understood that first PPDUs transmitted on different first links may be different. In other words, the ML entity may send different first PPDUs on different first links.

Optionally, the first PPDU includes one of the following three cases.

Case 1: The first PPDU includes a first-type MAC frame, but does not include a second-type MAC frame.

In this embodiment of this application, a receive end does not need to feed back a response frame for the first-type MAC frame. In other words, the first-type MAC frame does not need a response.

For example, the first-type MAC frame is a CTS-to-self frame. This is not limited in this embodiment of this application.

In this embodiment of this application, the receive end needs to feed back a response frame for the second-type MAC frame. In other words, the second-type MAC frame needs a response.

For example, the second-type MAC frame may be an RTS frame. When the second-type MAC frame is an RTS frame, the response frame for the second-type MAC frame is a CTS frame.

For example, the second-type MAC frame may be a data frame. When the second-type MAC frame is a data frame, the response frame for the second-type MAC frame is an acknowledgment (ACK) frame.

It should be understood that, if the ML entity sends the first PPDU corresponding to the case 1 on the primary link, the ML entity acknowledges by default that establishing of a TXOP succeeds.

Case 2: The first PPDU includes a second-type MAC frame, but does not include a first-type MAC frame.

Case 3: The first PPDU includes a first-type MAC frame and a second-type MAC frame.

For the case 2 or the case 3, it is assumed that the ML entity sends the first PPDU including a second-type MAC frame on the primary link. If the ML entity receives a response frame for the second-type MAC frame on the primary link, the ML entity determines that establishing of a TXOP succeeds; or if the ML entity does not receive a response frame for the second-type MAC frame on the primary link, the ML entity determines that establishing of a TXOP fails.

With reference to various cases of the first PPDU, the following specifically describes scenarios in which the ML entity sends the first PPDU on the K first links.

Scenario 1: The ML entity sends the first PPDU including a first-type MAC frame on each first link in the K first links.

Scenario 2: The ML entity sends the first PPDU including a first-type MAC frame on the primary link and a part of first nonprimary links, and sends the PPDU including a second-type MAC frame on the other part of first nonprimary links.

In the scenario 1 or the scenario 2, the ML entity acknowledges by default that establishing of a TXOP succeeds.

Scenario 3: The ML entity sends the first PPDU including a second-type MAC frame on each first link in the K first links.

Scenario 4: The ML entity sends the first PPDU including a second-type MAC frame on the primary link and a part of first nonprimary links, and sends the PPDU including a first-type MAC frame on the other part of first nonprimary links.

In the scenario 3 or the scenario 4, the ML entity receives a response frame for the second-type MAC frame on one or more first links. If the one or more first links do not include the primary link, the ML entity determines that establishing of a TXOP fails. If the one or more first links include the primary link, the ML entity determines that establishing of a TXOP succeeds.

In this embodiment of this application, when the establishing of the TXOP succeeds, maximum duration of the TXOP may be determined based on a duration field in the first PPDU transmitted on the primary link.

According to the technical solution shown in FIG. 5, because the ML entity sets the backoff counter only on the primary link, when performing channel access, the ML entity performs the backoff procedure only on the primary link. In this way, the ML entity cannot obtain a channel through contention before the backoff procedure of the primary link ends. This ensures that a probability of obtaining a channel through contention on the primary link is equal to a probability of obtaining a channel through contention on a supported link of an SL entity by the SL entity. Therefore, the technical solutions provided in this application can ensure fairness for the SL entity in channel contention, and therefore ensures proper communication of the SL entity.

In addition, according to the foregoing technical solution shown in FIG. 5, when the supported link of the SL entity and the primary link of the ML entity are a same link, the SL entity and the ML entity actually perform channel contention on the same link. In this way, when the ML entity successfully obtains the channel through contention on the primary link, the SL entity does not send a PPDU on the primary link. This ensures synchronization in receiving and sending performed by the ML entity on a plurality of links. For example, link #1 is used as a primary link. When a count value of a backoff counter of an ML AP entity on link #1 is 0, the ML AP entity sends a PPDU on link #1 and link #2. An SL entity does not send a PPDU to the ML AP entity on link #1. Therefore, the ML AP entity can synchronously receive signals, or synchronously send signals on link #1 and link #2.

Figure 6:
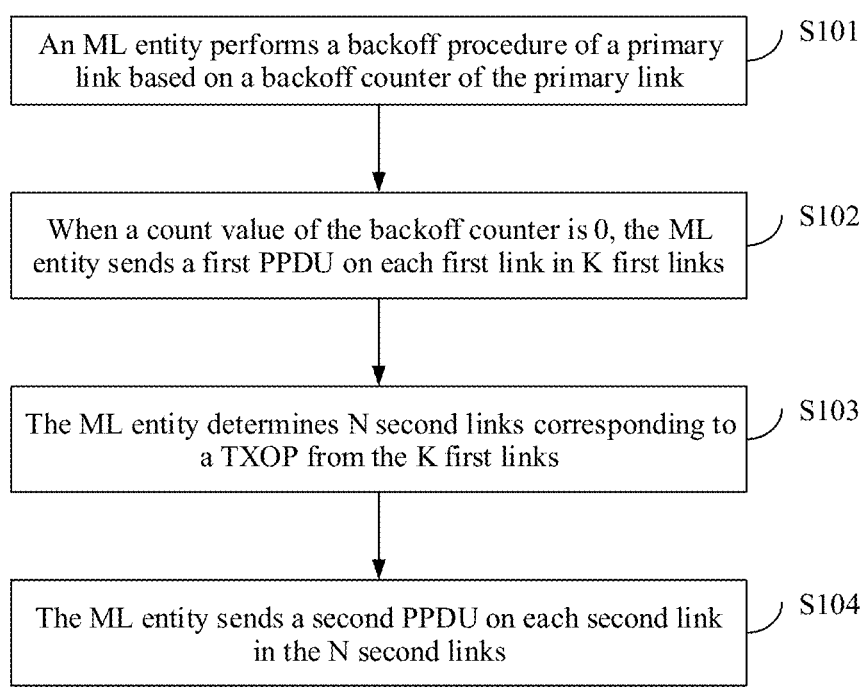
FIG. 6 is a flowchart of another communication method according to an embodiment of this application.

In an optional embodiment, based on the communication method shown in FIG. 5, in FIG. 6, when the ML entity successfully establishes the TXOP, the communication method further includes steps S103 and S104.

S103. The ML entity determines N second links corresponding to the TXOP from the K first links.

The N second links include the primary link and N−1 second nonprimary links, and N is a positive integer less than or equal to K.

In this embodiment of this application, the second nonprimary link is a first nonprimary link that meets a preset condition.

Optionally, the preset condition includes one of the following.

Condition 1: On the first nonprimary link, the ML entity sends the first PPDU including the first-type MAC frame.

Condition 2: On the first nonprimary link, the ML entity sends the first PPDU including the second-type MAC frame, and receives the response frame for the second-type MAC frame.

S104. The ML entity sends a second PPDU on each second link in the N second links.

The second PPDU is different from the first PPDU. In other words, the second PPDU is a PPDU other than the first PPDU.

It should be understood that second PPDUs sent by the ML entity on different second links may be different PPDUs, to implement extremely high throughput.

In this embodiment of this application, the ML entity sends the second PPDU on one second link. If the ML entity receives no response frame on the second link within specific duration, it indicates that transmission of the second PPDU on the second link fails. For example, the response frame may be a BA frame. This is not limited in this embodiment of this application.

It should be understood that, in a scenario in which transmission of the second PPDU fails on a second link, if the ML entity does not perform corresponding processing on the second link on which the transmission of the second PPDU fails, but continues to send the second PPDU on the second link on which the transmission of the second PPDU fails, the second PPDU sent by the ML entity may always fail to be transmitted, which affects proper communication of the ML entity.

The following describes a processing manner used by the ML entity in a scenario in which transmission of the second PPDU fails on one or more second links.

Processing manner 1: If transmission of the second PPDU succeeds on the primary link and transmission of the second PPDU fails on one or more second nonprimary links, the ML entity stops sending the second PPDU on a second link on which the transmission of the second PPDU fails, and continues to send, until the TXOP ends, the second PPDU on a second link on which the transmission of the second PPDU succeeds.

For example, the ML entity sends the second PPDU on nonprimary link #1, nonprimary link #2, nonprimary link #3, and the primary link separately. If transmission of the second PPDU fails on nonprimary link #2, the ML entity stops sending the second PPDU on nonprimary link #2, and continues to send the second PPDU on nonprimary link #1, nonprimary link #3, and the primary link.

Processing manner 2: If transmission of the second PPDU fails on one or more second links, the ML entity stops sending the second PPDU on the N second links. Then, the ML entity waits for the idle period of the primary link to reach the first inter-frame space. When the idle period of the primary link reaches the first inter-frame space, the ML entity sends the second PPDU on each third link in P third links.

The P third links include the primary link and P−1 third nonprimary links, and P is a positive integer less than or equal to N. The third nonprimary link is a second nonprimary link that is in an idle state in the first inter-frame space before a first time point, and the first time point is a time point at which the idle period of the primary link reaches the first inter-frame space.

Figure 7:
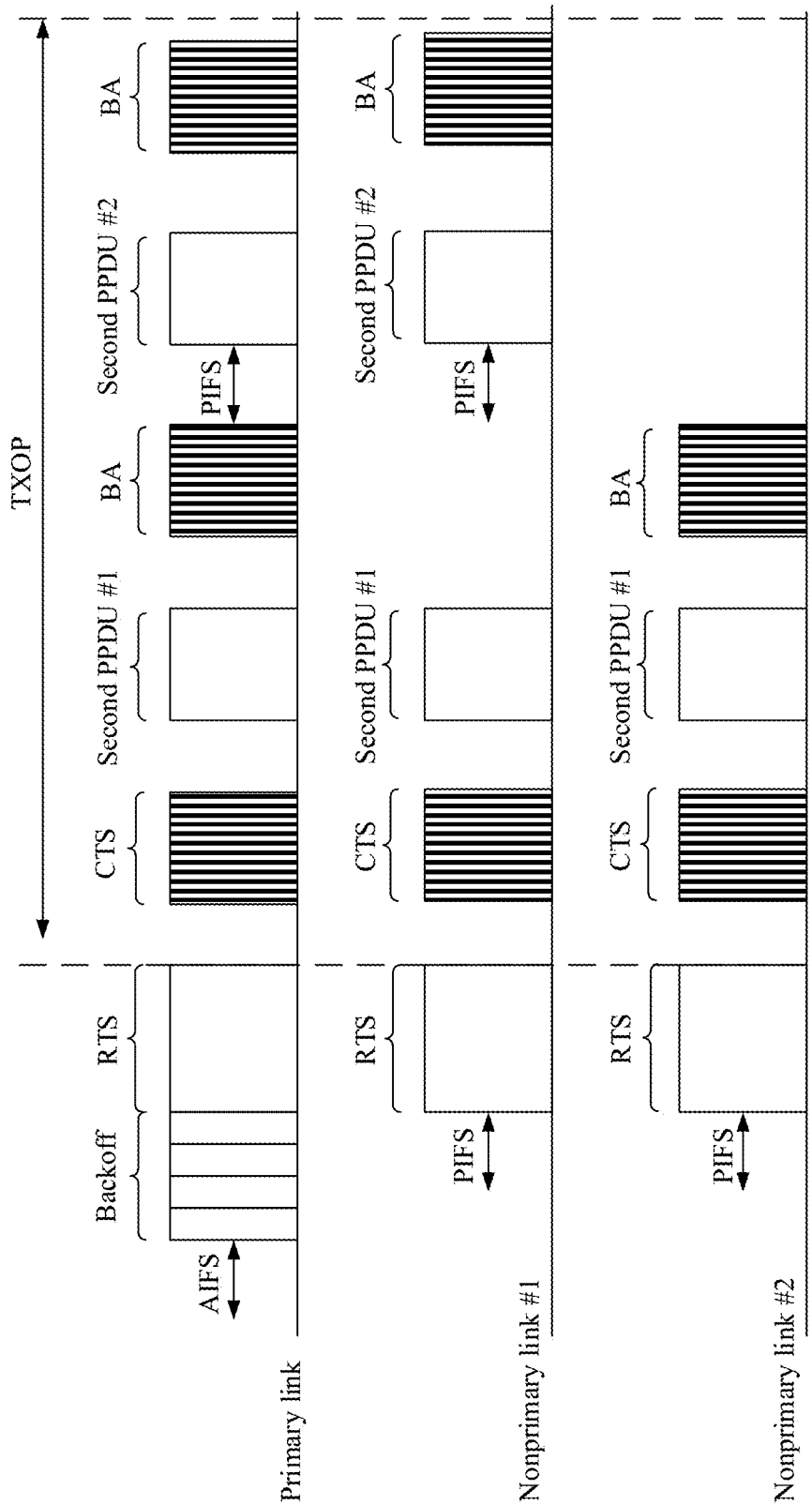
FIG. 7 is a schematic diagram of still another ML communication scenario according to an embodiment of this application.

An example is provided for description with reference to FIG. 7, the ML entity sends second PPDU #1 on nonprimary link #1, nonprimary link #2, and the primary link separately. Because the ML entity does not receive a BA frame on nonprimary link #1, the ML entity determines that transmission of second PPDU #1 fails on nonprimary link #1. In this case, the ML entity suspends sending the second PPDU on nonprimary link #1, nonprimary link #2, and the primary link. After one PIFS, nonprimary link #1 and the primary link in the PIFS are in the idle state, and nonprimary link #2 is in a busy state. Therefore, the ML entity can determine that nonprimary link #1 and the primary link are third links. In this case, the ML entity sends second PPDU #2 on nonprimary link #1 and the primary link, and the ML entity does not send second PPDU #2 on nonprimary link #2.

Processing manner 3: If transmission of the second PPDU fails on one or more second links, the ML entity stops sending the second PPDU on the N second links. Then, the ML entity performs the backoff procedure on the primary link. When the backoff procedure of the primary link ends, the ML entity sends the second PPDU on each third link in P third links.

The P third links include the primary link and P−1 third nonprimary links, and P is a positive integer less than or equal to N. The third nonprimary link is a second nonprimary link that is in the idle state in the first inter-frame space before an end time point of the backoff procedure of the primary link.

It should be understood that for details about that the ML entity performs the backoff procedure on the primary link, refer to the foregoing description in step S101. Details are not described herein again.

Figure 8:
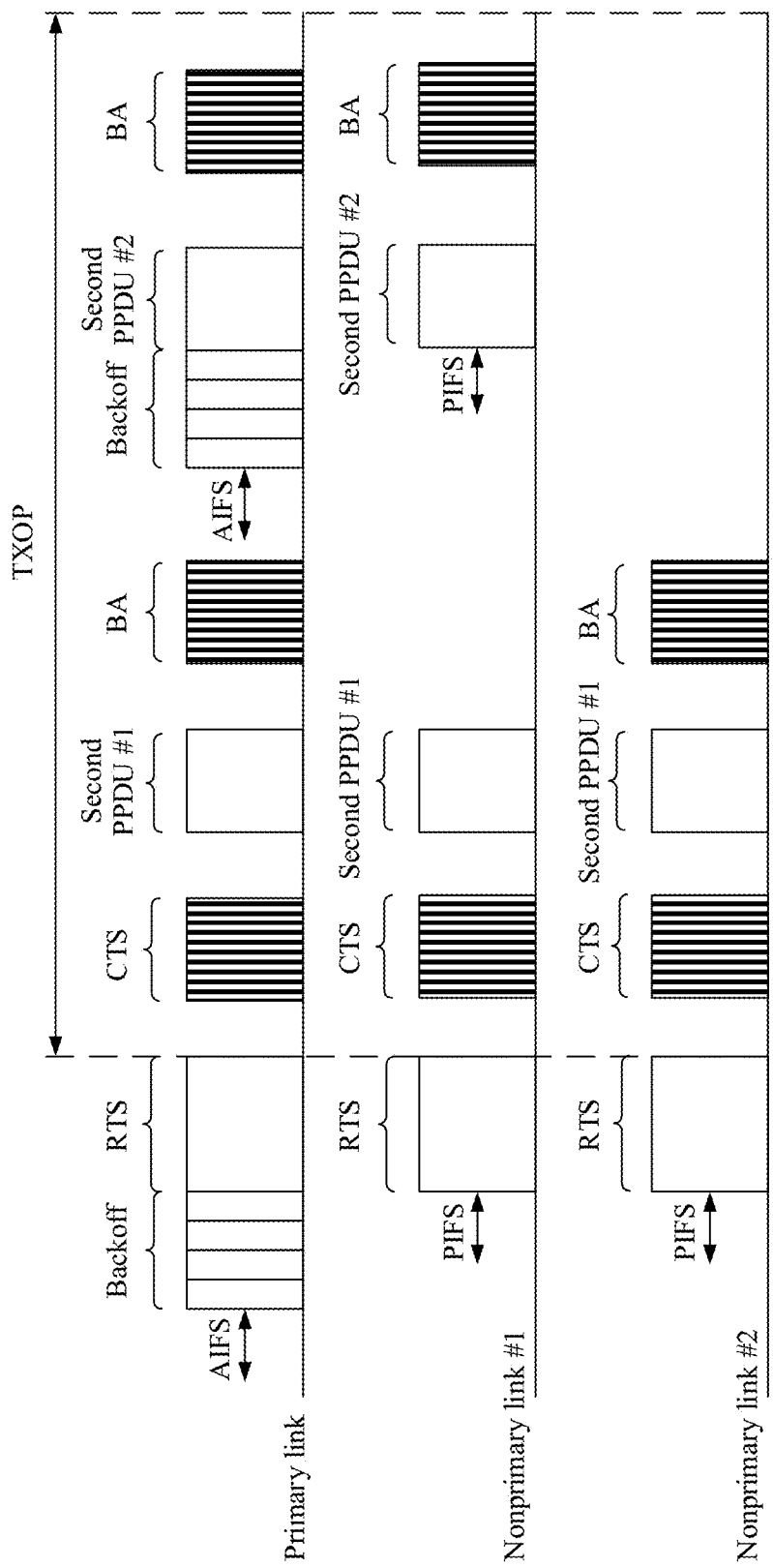
FIG. 8 is a schematic diagram of yet another ML communication scenario according to an embodiment of this application.

An example is provided for description with reference to FIG. 8, the ML entity sends second PPDU #1 on nonprimary link #1, nonprimary link #2, and the primary link separately. Because the ML entity does not receive a BA frame on nonprimary link #1, the ML entity determines that transmission of second PPDU #1 fails on nonprimary link #1. In this case, the ML entity suspends sending the second PPDU on nonprimary link #1, nonprimary link #2, and the primary link. The ML entity sets the count value of the backoff counter of the primary link. In a PIFS before a time point at which the backoff counter of the primary link decreases to 0, nonprimary link #1 and the primary link are in the idle state, and nonprimary link #2 is in the busy state. Therefore, the ML entity can determine that nonprimary link #1 and the primary link are third links. In this case, the ML entity sends second PPDU #2 on nonprimary link #1 and the primary link, and the ML entity does not send second PPDU #2 on nonprimary link #2.

It should be understood that, in the foregoing processing manner 2 or processing manner 3, for each third link in the P third links, that the ML entity sends the second PPDU on the third links includes: The ML entity sends the second PPDU on second available channels of the third links. For one link, second available channels are a subset of the first available channels. The second available channels also include a primary channel.

It should be understood that, in the foregoing processing manner 2 or processing manner 3, that the transmission of the second PPDU fails on one or more second links specifically means that the transmission of the second PPDU fails on the primary link, and/or the transmission of the second PPDU fails on one or more second nonprimary links.

According to any one of the foregoing processing manners, in a scenario in which the transmission of the second PPDU fails on one or more second links, proper communication of the ML entity can be ensured.

Figure 9A:
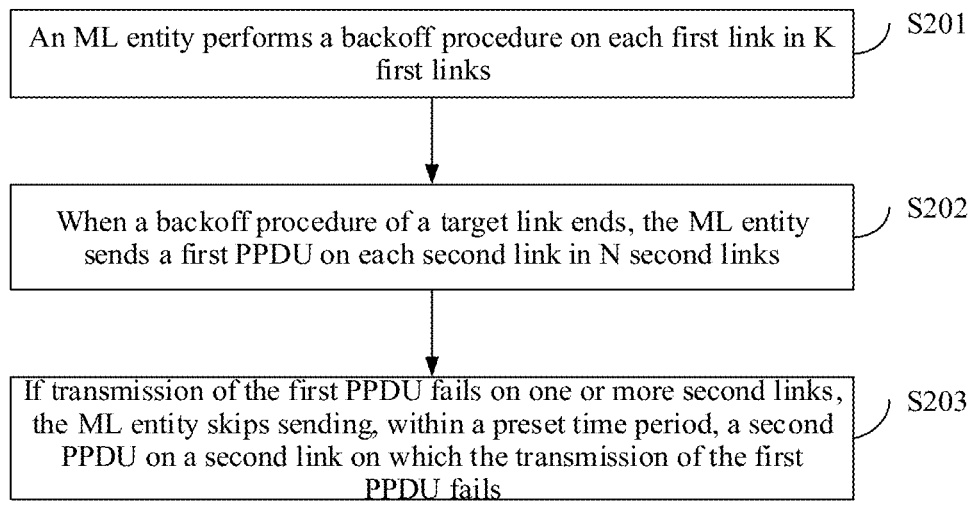
FIG. 9(a) is a flowchart of still another communication method according to an embodiment of this application.

FIG. 9(a) shows a communication method according to an embodiment of this application. The method includes the following steps.

S201. An ML entity performs a backoff procedure on each first link in K first links.

The ML entity supports K first links, and K is a positive integer greater than or equal to 2. A backoff counter is disposed on each first link in the K first links.

For each first link in the K first links, the backoff procedure of the first link includes the following step: The ML entity waits for an idle period of the first link to reach a second inter-frame space. After the idle period of the first link reaches the second inter-frame space, each time the first link is in the idle state in one timeslot, the ML entity decreases a count value of the backoff counter of the first link by 1. When the count value of the backoff counter of the first link is 0, the ML entity ends the backoff procedure of the first link.

In this embodiment of this application, if the first link is in the busy state in one timeslot, the ML entity freezes the backoff counter of the first link until the idle period of the first link reaches the second inter-frame space again. It should be understood that, that the backoff counter of the first link is frozen is equivalent to that the backoff procedure of the first link is suspended.

The second inter-frame space may be an AIFS. This is not limited in this embodiment of this application.

The busy/idle state of the first link may be determined based on the busy/idle state of a primary channel of the first link. In other words, if the primary channel of the first link is in the busy state, it indicates that the first link is in the busy state. If the primary channel of the first link is in the idle state, it indicates that the first link is in the idle state.

Optionally, the primary channel of the first link may be a primary channel of 20 MHz.

Optionally, the primary channel of the first link may be explicitly configured. It should be understood that explicitly configuring the primary channel of the first link is flexible.

For example, the ML entity may receive a MAC frame from another device, where the MAC frame is used to indicate a frequency domain location of the primary channel of the first link in a frequency band corresponding to the first link. Optionally, the MAC frame may be a management frame such as a beacon frame or an association response frame.

Optionally, the primary channel of the first link may be implicitly configured. It should be understood that implicitly configuring the primary channel of the first link helps reduce signaling overheads.

For example, a preset frequency domain location of the primary channel of the first link in a frequency band corresponding to the first link may be defined in a protocol. In an example, a subchannel with a highest frequency of 20 MHz in the frequency band corresponding to the first link is used as the primary channel of the first link. In another example, a subchannel with a lowest frequency of 20 MHz in the frequency band corresponding to the first link is used as the primary channel of the first link.

In this embodiment of this application, when the ML entity separately performs backoff procedures of the K first links, if the backoff procedure of one link ends first, the ML entity performs step S202.

S202. When a backoff procedure of a target link ends, the ML entity sends a first PPDU on each second link in N second links.

The target link is a first link whose backoff procedure ends first in the K first links. In other words, the target link is a first link that is in the K first links and on which the count value of the backoff counter decreases to 0 first.

The N second links include the target link and N−1 available links, and N is a positive integer less than or equal to K.

In this embodiment of this application, the available link is a first link that is in the idle state in a first inter-frame space before an end time point of the backoff procedure of the target link. In other words, the available link is a first link whose primary channel is in the idle state in the first inter-frame space before the end time point of the backoff procedure of the target link.

It should be understood that, if one first link (or a primary channel of the first link) is in the busy state in the first inter-frame space before the end time point of the backoff procedure of the target link, the first link is not an available link.

In this embodiment of this application, after the backoff procedure of the target link ends, the ML entity stops a backoff procedure of another first link other than the target link in the K first links until a TXOP ends.

It should be understood that first PPDUs transmitted on different second links may be different. In other words, the ML entity may send different first PPDUs on different second links.

S203. If transmission of the first PPDU fails on one or more second links, the ML entity skips sending, within a preset time period, a second PPDU on a second link on which the transmission of the first PPDU fails.

The second PPDU and the first PPDU are two different PPDUs. In other words, the second PPDU is a PPDU other than the first PPDU.

For example, that transmission of the first PPDU fails on the second link may refer to that the ML entity does not receive, on the second link, a response frame corresponding to the first PPDU. It should be understood that the response frame corresponding to the first PPDU is used to respond to a MAC frame carried in the first PPDU. For example, if the first PPDU carries an RTS frame, the response frame for the first PPDU may be a CTS frame.

Optionally, the preset time period may be preconfigured or defined in a protocol. This is not limited in this embodiment of this application.

For example, the ML entity separately sends the first PPDU on link #1, link #3, and link #4. If the ML entity does not receive on link #1 a response frame corresponding to the first PPDU, the ML entity can determine that transmission of the first PPDU fails on link #1. Therefore, the ML entity does not send the second PPDU on link #1 within the preset time period.

Figure 9B:
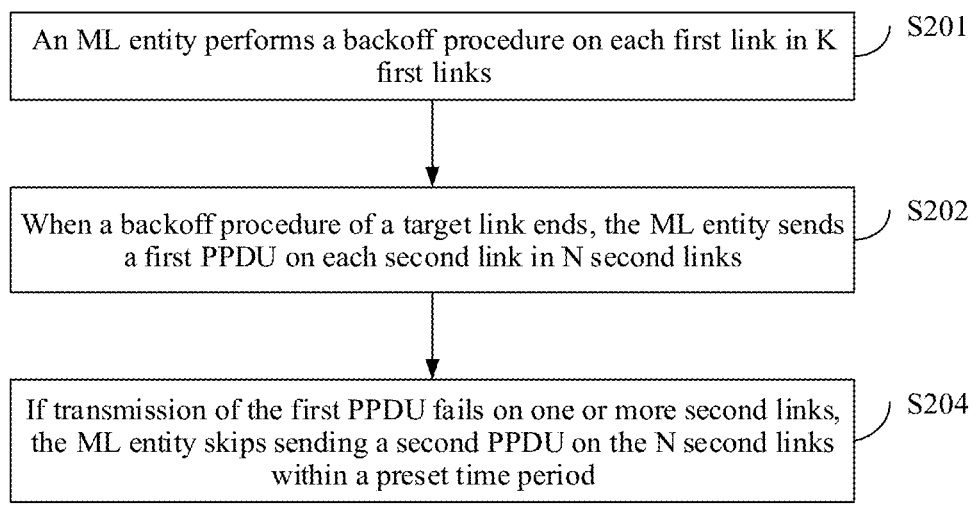
FIG. 9(b) is a flowchart of yet another communication method according to an embodiment of this application.

Optionally, in FIG. 9(b), step S203 in FIG. 9(a) may be replaced with step S204.

S204. If transmission of the first PPDU fails on one or more second links, the ML entity skips sending a second PPDU on the N second links within a preset time period.

For example, the ML entity separately sends the first PPDU on link #1, link #3, and link #4. If the ML entity does not receive on link #1 a response frame corresponding to the first PPDU, the ML entity can determine that transmission of the first PPDU fails on link #1. Therefore, the ML entity does not send the second PPDU on link #1, link #3, and link #4 within the preset time period.

According to the technical solution shown in FIG. 9(a) or FIG. 9(b), when the ML entity fails to transmit the first PPDU on one or more second links, the ML entity is prohibited from sending, within a preset time period, a second PPDU on a second link on which transmission of the first PPDU fails, or the ML entity is prohibited from sending a second PPDU on the N second links within a preset time period. In this way, within the preset time period, the ML entity cannot use a plurality of links (for example, the N second links or second links on which transmission of the first PPDU fails). If one link that the ML entity cannot use and that is in the plurality of links is supported by an SL entity, within the preset time period, because the ML entity cannot perform channel contention on the link supported by the SL entity, a probability that the SL entity obtains a channel through contention increases. This ensures fairness for the SL entity in channel contention, and therefore ensures proper communication of the SL entity.

Figure 10:
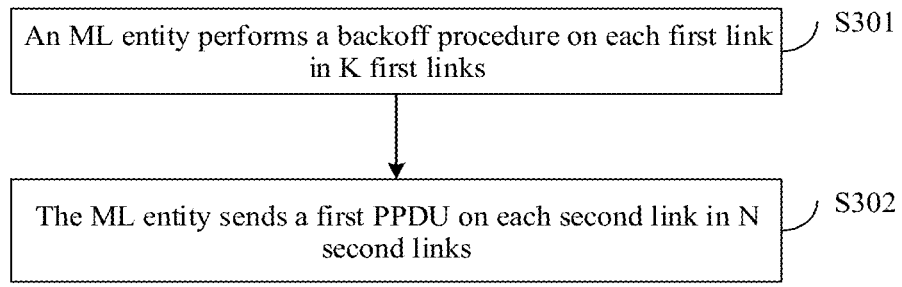
FIG. 10 is a flowchart of still yet another communication method according to an embodiment of this application.

FIG. 10 shows a communication method according to an embodiment of this application. The method includes the following steps.

S301. An ML entity performs a backoff procedure on each first link in K first links.

The ML entity supports K first links, and K is an integer greater than or equal to 2. A backoff counter is disposed on each first link in the K first links.

For each first link in the K first links, the backoff procedure of the first link includes the following step: The ML entity waits for an idle period of the first link to reach a second inter-frame space. After the idle period of the first link reaches the second inter-frame space, each time the first link is in the idle state in one timeslot, the ML entity decreases a count value of the backoff counter of the first link by 1. When the count value of the backoff counter of the first link is 0, the ML entity ends the backoff procedure of the first link.

In this embodiment of this application, if the first link is in the busy state in one timeslot, the ML entity freezes the backoff counter of the first link until the idle period of the first link reaches the second inter-frame space again. It should be understood that, that the backoff counter of the first link is frozen is equivalent to that the backoff procedure of the first link is suspended.

The second inter-frame space may be an AIFS. This is not limited in this embodiment of this application.

The busy/idle state of the first link may be determined based on the busy/idle state of a primary channel of the first link. In other words, if the primary channel of the first link is in the busy state, it indicates that the first link is in the busy state. If the primary channel of the first link is in the idle state, it indicates that the first link is in the idle state.

Optionally, the primary channel may be a primary channel of 20 MHz. For each first link, for a method for configuring a primary channel of the first link, refer to the foregoing description. Details are not described herein again.

S302. The ML entity sends a first PPDU on each second link in N second links.

The N second links are a subset of the K first links, and N is a positive integer less than or equal to K.

In this embodiment of this application, the second link is a first link whose backoff procedure has ended and that is in the idle state in a first inter-frame space before a first time point.

In other words, if a backoff procedure of one first link has not ended before the first time point, the first link is not a second link. Alternatively, if a first link is in the busy state in the first inter-frame space before the first time point, the first link is not a second link.

For example, the ML entity performs a backoff procedure on link #1, link #2, link #3, and link #4 separately. Before the first time point, the backoff procedure of link #1 has ended, the backoff procedure of link #2 has ended, and the backoff procedure of link #4 has ended. In addition, in the first inter-frame space before the first time point, link #1 is in the idle state, link #2 is in the busy state, and link #4 is in the idle state. Therefore, the ML entity can determine that link #1 and link #4 are the second links.

Optionally, the first time point may be preconfigured or defined in a protocol.

Optionally, the first time point may be an end time point of the backoff procedure of the target link.

For example, the target link may be a second link whose backoff procedure ends last in the N second links.

For example, the target link may be the kth first link in the K first links to end a backoff procedure, and k is an integer greater than 1 and less than or equal to K.

It should be understood that first PPDUs transmitted on different second links may be different. In other words, the ML entity may send different first PPDUs on different second links.

According to the foregoing technical solution shown in FIG. 10, although the ML performs the backoff procedure on all the K first links, the second link used to send the first PPDU needs to satisfy a condition that the backoff procedure of the second link has ended. In other words, on one link, the ML entity may obtain a channel through contention only after the ML entity ends a backoff procedure on the link. Compared with the conventional technology in which an ML entity can obtain a channel through contention on one link even if a backoff procedure on the link has not ended, the technical solution in this application reduces a probability that an ML entity obtains a channel through contention on one link. This ensures fairness for an SL entity in channel contention, and therefore ensures proper communication of the SL entity.

Figure 11A:
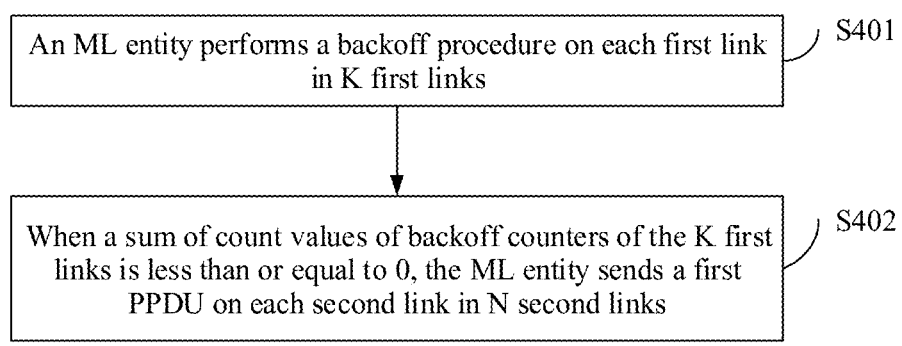
FIG. 11(a) is a flowchart of a further communication method according to an embodiment of this application.

FIG. 11(a) shows a communication method according to an embodiment of this application. The method includes the following steps.

S401. An ML entity performs a backoff procedure on each first link in K first links.

The ML entity supports the K first links, and K is an integer greater than or equal to 2. A backoff counter is disposed on each first link in the K first links.

For each first link in the K first links, the backoff procedure on the first link includes the following step: The ML entity waits for an idle period of the first link to reach a second inter-frame space. After the idle period of the first link reaches the second inter-frame space, each time the first link is in the idle state in one timeslot, the ML entity decreases a count value of the backoff counter of the first link by 1.

The second inter-frame space may be an AIFS. This is not limited in this embodiment of this application.

In this embodiment of this application, a value range of the backoff counter of the first link includes negative integers. In other words, after the ML entity decreases the count value of the backoff counter of the first link to 0, the ML entity does not end the backoff procedure of the first link, but continues the backoff.

For example, an initial value of a backoff counter of link #1 is 5. After an idle period of link #1 reaches the second inter-frame space, if link #1 is in the idle state in six consecutive timeslots, a count value of the backoff counter of the link #1 may be −1.

In this embodiment of this application, if the first link is in the busy state in one timeslot, the ML entity freezes the backoff counter of the first link until the idle period of the first link reaches the second inter-frame space again. It should be understood that, that the backoff counter of the first link is frozen is equivalent to that the backoff procedure of the first link is suspended.

The busy/idle state of the first link may be determined based on the busy/idle state of a primary channel of the first link. In other words, if the primary channel of the first link is in the busy state, it indicates that the first link is in the busy state. If the primary channel of the first link is in the idle state, it indicates that the first link is in the idle state.

Optionally, the primary channel may be a primary channel of 20 MHz. For each first link, for a method for configuring a primary channel of the first link, refer to the foregoing description. Details are not described herein again.

S402. When a sum of count values of backoff counters of the K first links is less than or equal to 0, the ML entity sends a first PPDU on each second link in N second links.

The N second links are a subset of the K first links, and N is a positive integer less than or equal to K.

In this embodiment of this application, the second link is a first link that is in the idle state in the second inter-frame space before a current time point. In other words, the second link is a first link on which the backoff counter is not frozen. In other words, the second link is a first link on which the backoff procedure is not suspended.

In step S402, the current time point is a time point at which a sum of count values of backoff counters of the K first links is less than or equal to 0.

Optionally, in one timeslot, the ML entity may collect statistics on a sum of count values of backoff counters of the K first links, to determine whether the sum of the count values of the backoff counters of the K first links is less than or equal to 0.

Optionally, the ML entity further is configured with a target counter, and the target counter is configured to record a sum of count values of backoff counters of the K first links. In this way, in one timeslot, the ML may determine, by determining whether a sum of count values of the target counters is less than or equal to 0, whether the sum of the count values of the backoff counters of the K first links is less than or equal to 0.

During specific implementation, the ML entity configures a target counter, and an initial value of the target counter is equal to a sum of initial values of backoff counters of the K first links. For each first link in the K first links, after the idle period of the first link reaches the second inter-frame space, each time a primary channel of the first link is in the idle state in one timeslot, the ML entity decreases a count value of the target counter by 1. In other words, each time the ML entity decreases a backoff counter of one first link by 1, the ML entity decreases the count value of the target counter by 1.

Figure 11B:
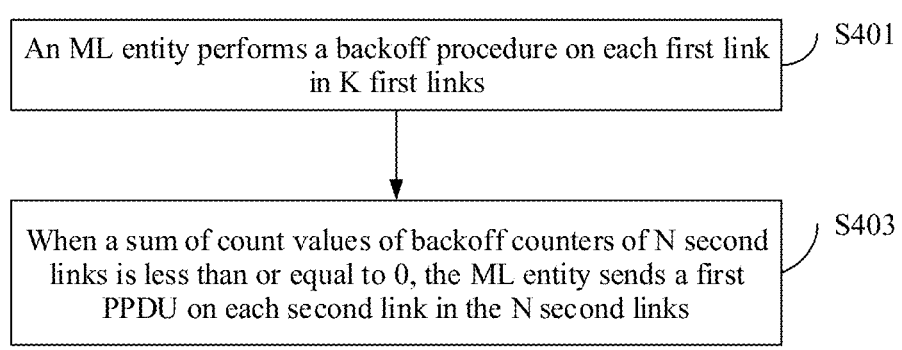
FIG. 11(b) is a flowchart of a still further communication method according to an embodiment of this application.

Optionally, in FIG. 11(b), step S402 in FIG. 11(a) may be replaced with step S403.

S403. When a sum of count values of backoff counters of N second links is less than or equal to 0, the ML entity sends a first PPDU on each second link in the N second links.

In this embodiment of this application, the second link is a first link that is in the idle state in the second inter-frame space before a current time point. In other words, the second link is a first link on which the backoff counter is not frozen. In other words, the second link is a first link on which the backoff procedure is not suspended.

In step S403, the current time point is a time point at which a sum of count values of backoff counters of the N second links is less than or equal to 0.

Optionally, in one timeslot, the ML entity may collect statistics on a sum of count values of backoff counters of N second links, to determine whether the sum of the count values of the backoff counters of the N second links is less than or equal to 0.

It should be understood that, in step S403 or step S402, first PPDUs transmitted on different second links may be different. In other words, the ML entity may send different first PPDUs on different second links.

According to the technical solution shown in FIG. 11(a) or FIG. 11(b), although the ML entity performs the backoff procedure on each first link in the K first links, the ML entity may successfully obtain the channel through contention only when the sum of the count values of the backoff counters of the K first links is less than or equal to 0 or the sum of the count values of the backoff counters of the N second links is less than or equal to 0. In other words, for the ML entity, count values of backoff counters of one or more first links need to be less than 0. This requires that one or more first links be idle for a relatively long time. In this way, a probability that the ML entity obtains a channel through contention is reduced. That the probability that the ML entity obtains a channel through contention is reduced weakens an advantage of the ML entity over an SL entity in channel contention, ensures fairness for the SL entity in channel contention, and therefore ensures proper communication of the SL entity.

Figure 12:
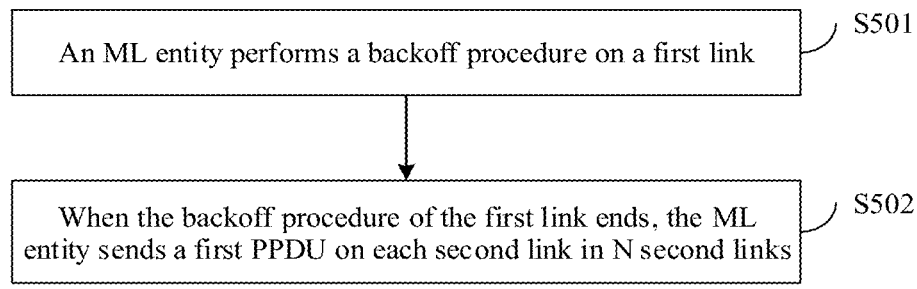
FIG. 12 is a flowchart of a yet further communication method according to an embodiment of this application.

FIG. 12 shows a communication method according to an embodiment of this application. The method includes the following steps.

S501. An ML entity performs a backoff procedure on a first link.

The ML entity supports a plurality of links.

In this embodiment of this application, a backoff counter may be disposed on each link in the plurality of links. However, each time the ML entity initiates channel access of the plurality of links, the ML entity performs backoff by using only a backoff counter of one link (to be specific, the first link).

Optionally, one random link in the plurality of links serves as the first link. Alternatively, the plurality of links each serve as the first link in turn according to a preset cyclic order.

Optionally, the cyclic order may be a descending order of sequence numbers of the plurality of links, an ascending order of sequence numbers of the plurality of links, or a pseudo-random order of sequence numbers of the plurality of links. This is not limited in this embodiment of this application.

For example, the ML entity supports seven links, and sequence numbers of the seven links are 0, 1, 2, 3, 4, 5, and 6. A preset cyclic order is "01204465", and each digit in the cyclic order is a sequence number of a link. In this way, when performing channel access for the first time, the ML entity uses the link whose sequence number is 0 as the first link. When performing channel access for the second time, the ML entity uses the link whose sequence number is 1 as the first link. By analogy, when performing channel access for the tenth time, the ML entity uses the link whose sequence number is 1 as the first link.

It should be understood that different ML entities may be configured with different cyclic orders. This is not limited in this application.

In this embodiment of this application, that the ML entity performs the backoff procedure on the first link includes the following step: The ML entity waits for an idle period of the first link to reach a second inter-frame space. After the idle period of the first link reaches the second inter-frame space, each time the first link is in the idle state in one timeslot, the ML entity decreases a count value of the backoff counter of the first link by 1. When the count value of the backoff counter of the first link is 0, the ML entity ends the backoff procedure of the first link.

In this embodiment of this application, if the first link is in the busy state in one timeslot, the ML entity freezes the backoff counter of the first link until the idle period of the first link reaches the second inter-frame space again. It should be understood that, that the backoff counter of the first link is frozen is equivalent to that the backoff procedure of the first link is suspended.

The second inter-frame space may be an AIFS. This is not limited in this embodiment of this application.

The busy/idle state of the first link may be determined based on the busy/idle state of a primary channel of the first link. In other words, if the primary channel of the first link is in the busy state, it indicates that the first link is in the busy state. If the primary channel of the first link is in the idle state, it indicates that the first link is in the idle state.

Optionally, the primary channel of the first link may be a primary channel of 20 MHz. For a method for configuring a primary channel of the first link, refer to the foregoing description. Details are not described herein again.

S502. When the backoff procedure of the first link ends, the ML entity sends a first PPDU on each available link in N available links.

The N available links include the first link and N−1 second links, and N is a positive integer.

It should be understood that the second link and the first link are two different links. The second link is in the idle state in a first inter-frame space before an end time point of the backoff procedure of the first link.

It should be understood that first PPDUs transmitted on different second links may be different. In other words, the ML entity may send different first PPDUs on different second links.

According to the technical solution shown in FIG. 12, each time channel access is performed, the ML entity performs a backoff procedure only on a first link. In other words, the ML entity performs channel contention on only one link. A probability that the ML entity obtains a channel through contention on one link is equal to a probability that an SL entity obtains a channel through contention on one link. In this way, fairness for the SL entity in channel contention is ensured, and therefore proper communication of the SL entity is ensured.

In the technical solutions shown in FIG. 9(a), FIG. 9(b), FIG. 10, FIG. 11(a), FIG. 11(b), or FIG. 12, the first PPDU may include the following three cases.

Case 1: The first PPDU includes a first-type MAC frame, but does not include a second-type MAC frame.

Case 2: The first PPDU includes a second-type MAC frame, but does not include a first-type MAC frame.

Case 3: The first PPDU includes a first-type MAC frame and a second-type MAC frame.

For detailed descriptions of the first-type MAC frame and the second-type MAC frame, refer to the descriptions in step S102. Details are not described herein again.

With reference to various cases of the first PPDU, the following specifically describes scenarios in which the ML entity sends the first PPDU on N second links.

Scenario 1: The ML entity sends the first PPDU including only a first-type MAC frame on each second link in the N second links.

Scenario 2: The ML entity sends the first PPDU including only a first-type MAC frame on a part of second links, and sends the first PPDU including a second-type MAC frame on the other part of second links.

In the scenario 1 or the scenario 2, the ML entity acknowledges by default that establishing of a TXOP succeeds.

Scenario 3: The ML entity sends the first PPDU including a second-type MAC frame on each second link in the N second links.

In the scenario 3, if the ML entity does not receive a response frame for the second-type MAC frame on any second link, the ML entity acknowledges that establishing of a TXOP fails. If the ML entity receives a response frame for the second-type MAC frame on at least one second link, the ML entity acknowledges that establishing of a TXOP succeeds.

Figure 13:
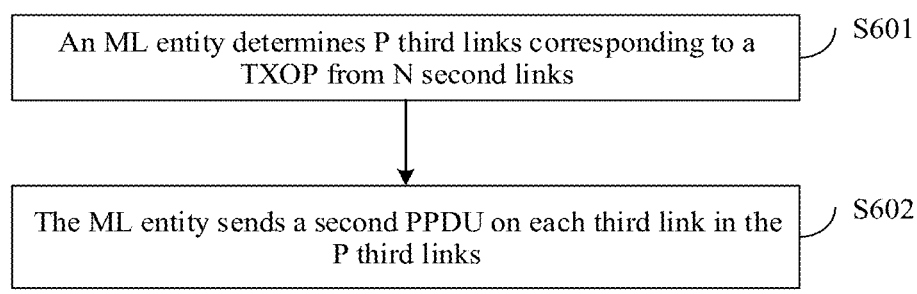
FIG. 13 is a flowchart of a still yet further communication method according to an embodiment of this application.

In an optional embodiment, based on the technical solutions shown in FIG. 10 to FIG. 12, in FIG. 13, when the ML entity successfully establishes a TXOP, the communication method further includes the following steps S601 and S602.

S601. The ML entity determines P third links corresponding to the TXOP from the N second links.

The P third links are a subset of the N second links, and P is a positive integer less than or equal to N.

In this embodiment of this application, the third link is a second link that meets a preset condition.

Optionally, the preset condition includes one of the following.

Condition 1: On the second link, the ML entity sends a first PPDU including a first-type MAC frame.

Condition 2: On the second link, the ML entity sends a first PPDU including a second-type MAC frame, and receives a response frame for the second-type MAC frame.

S602. The ML entity sends a second PPDU on each third link in the P third links.

It should be understood that second PPDUs transmitted on different third links may be different. In other words, the ML entity may send different second PPDUs on different third links.

Optionally, when transmission of the PPDU fails on one or more third links, the ML entity may use any one of the following processing manners.

Processing manner 1: The ML entity stops sending the second PPDU on the third link on which the transmission of the second PPDU fails, and continues to send, until the TXOP ends, the second PPDU on a third link on which the transmission of the second PPDU succeeds.

Processing manner 2: The ML entity stops sending the second PPDU on the P third links. The ML entity waits until a preset time point to determine L fourth links. In addition, the ML entity sends the second PPDU on each fourth link in the L fourth links.

The L fourth links are a subset of P third links, and L is a positive integer less than or equal to P. The fourth link is a third link that is in the idle state in a first inter-frame space before the preset time point.

It should be understood that the preset time point may be preconfigured or defined in a protocol.

Processing manner 3: The ML entity stops sending the second PPDU on the P third links. The ML entity performs a backoff procedure on each third link in the P third links. When a backoff procedure of a target third link ends, the ML entity determines L fourth links. In addition, the ML entity sends the second PPDU on each fourth link in the L fourth links.

The L fourth links are a subset of P third links, and L is a positive integer less than or equal to P. The fourth link is a third link that is in the idle state in a first inter-frame space before the backoff procedure of the target third link ends. The target third link may be a third link whose backoff procedure ends first in the P third links.

According to any one of the foregoing processing manners, in a scenario in which the transmission of the second PPDU fails on one or more third links, proper communication of the ML entity can be ensured.

The foregoing mainly describes the solutions provided in the embodiments of this application from a perspective of the ML entity. It may be understood that, to implement the foregoing functions, the ML entity includes a corresponding hardware structure and/or software module for implementing each function. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraint conditions of the technical solutions. A person skilled in the art may use a different method to implement the described functions for each particular application, but it should not be considered that the implementation goes beyond the scope of this application.

In the embodiments of this application, the apparatus may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that in the embodiments of this application, division into the modules is an example and is merely logical function division, and may be other division in an actual implementation. An example in which each function module is obtained through division based on each corresponding function is used below for description.

Figure 14:
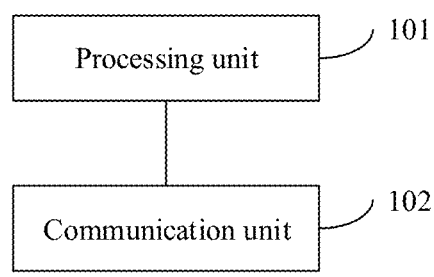
FIG. 14 is a schematic diagram of a structure of an ML entity according to an embodiment of this application.

FIG. 14 is a schematic diagram of a structure of an ML entity according to an embodiment of this application. As shown in FIG. 14, the ML entity includes a processing unit 101 and a communication unit 102.

Optionally, the ML entity may perform any one of the following solutions.

Solution 1

The ML entity supports a primary link and at least one nonprimary link. A backoff counter is disposed on the primary link, and no backoff counter is disposed on the nonprimary link. The processing unit 101 is configured to perform a backoff procedure of the primary link based on the backoff counter. The communication unit 102 is configured to: when a count value of the backoff counter decreases to 0, be used by the ML entity to send a first PPDU on each first link in K first links, where the K first links include the primary link and K−1 first nonprimary links, the first nonprimary link is in the idle state in a first inter-frame space before a time point at which the count value of the backoff counter decreases to 0, and K is a positive integer.

In a possible design, the communication unit 102 is specifically configured to send the first PPDU on an available channel of each first link in the K first links, where an available channel of the primary link includes a primary channel of the primary link, and an available channel of the first nonprimary link includes a primary channel of the first nonprimary link.

In a possible design, the processing unit 101 is specifically configured to: wait for an idle period of the primary channel of the primary link to reach a second inter-frame space; after the idle period of the primary channel of the primary link reaches the second inter-frame space, each time the primary channel of the primary link is in the idle state in one timeslot, decrease the count value of the backoff counter by 1; and when the count value of the backoff counter decreases to 0, end the backoff procedure of the primary link.

In a possible design, that the first nonprimary link is in the idle state in the first inter-frame space before an end time point of the backoff procedure of the primary link includes: The primary channel of the first nonprimary link is in the idle state in the first inter-frame space before the time point at which the count value of the backoff counter decreases to 0.

In a possible design, the primary channel of the first nonprimary link is a subchannel with a lowest frequency, 20 MHz, in a frequency band corresponding to the first nonprimary link. Alternatively, the primary channel of the first nonprimary link is a subchannel with a highest frequency, 20 MHz, in a frequency band corresponding to the first nonprimary link.

In a possible design, the first PPDU includes a first-type MAC frame, where the first-type MAC frame does not need a response.

In a possible design, the first PPDU includes a second-type MAC frame, where the second-type MAC frame needs a response. The communication unit 102 is further configured to receive a response frame for the second-type MAC frame on one or more first links. The processing unit 101 is further configured to: when the one or more first links do not include the primary link, determine that establishing of a TXOP fails; when the one or more first links include the primary link, determine that establishing of a TXOP succeeds.

In a possible design, the processing unit 101 is further configured to: determine N second links corresponding to the TXOP, where the N second links include the primary link and N−1 second nonprimary links, the second nonprimary link is a first nonprimary link that meets a preset condition, where the preset condition includes: On the first nonprimary link, the ML entity sends the first PPDU including the first-type MAC frame, or on the first nonprimary link, the ML entity sends the first PPDU including the second-type MAC frame, and receives the response frame for the second-type MAC frame. The communication unit 102 is further configured to send a second PPDU on each second link in the N second links.

In a possible design, the communication unit 102 is further configured to: if transmission of the second PPDU fails on one or more second nonprimary links, stop sending the second PPDU on a second link on which the transmission of the second PPDU fails, and continue to send, until the TXOP ends, the second PPDU on a second link on which transmission of the second PPDU succeeds.

In a possible design, the communication unit 102 is further configured to: if transmission of the second PPDU fails on one or more second links, stop sending the second PPDU on the N second links. The processing unit 101 is further configured to wait for the idle period of the primary link to reach the first inter-frame space. The communication unit 102 is further configured to: after the idle period of the primary link reaches the first inter-frame space, send the second PPDU on each third link in the P third links, where the P third links include the primary link and P−1 third nonprimary links, the third nonprimary link is a second nonprimary link that is in the idle state in the first inter-frame space before a first time point, the first time point is a time point at which the idle period of the primary link reaches the first inter-frame space, and P is a positive integer less than or equal to N.

In a possible design, the communication unit 102 is further configured to: if transmission of the second PPDU fails on one or more second links, stop sending the second PPDU on the N second links. The processing unit 101 is further configured to perform the backoff procedure on the primary link. The communication unit 102 is further configured to: after the backoff procedure of the primary link ends, send the second PPDU on each third link in the P third links, where the P third links include the primary link and P−1 third nonprimary links, the third nonprimary link is a second nonprimary link that is in the idle state in the first inter-frame space before the end time point of the backoff procedure of the primary link, and P is a positive integer less than or equal to N.

Solution 2

The ML entity supports K first links. The processing unit 101 is configured to perform a backoff procedure on each first link in the K first links, where K is a positive integer greater than or equal to 2. The communication unit 102 is configured to: when a backoff procedure of a target link ends, send a first PPDU on each second link in N second links, where the second link is a first link that is in an idle state in a first inter-frame space before an end time point of the backoff procedure of the target link, the target link is a first link whose backoff procedure ends first in the K first links, and N is a positive integer less than or equal to K. The communication unit 102 is further configured to: if transmission of the first PPDU fails on one or more second links, skip sending, within a preset time period, a second PPDU on a second link on which the transmission of the first PPDU fails, or skip sending a second PPDU on the N second links within a preset time period.

Solution 3

The ML entity supports K first links. The processing unit 101 is configured to perform a backoff procedure on each first link in the K first links, where K is a positive integer greater than or equal to 2. The communication unit 102 is configured to send a first PPDU on each second link in N second links, where the second link is a first link whose backoff procedure has ended and that is in an idle state in a first inter-frame space before a first time point, and N is a positive integer less than or equal to M.

In a possible design, the first time point is an end time point of a backoff procedure of a target link, and the target link is a second link whose backoff procedure ends last in the N second links.

Solution 4

The ML entity supports K first links. The processing unit 101 is configured to perform a backoff procedure on each first link in the K first links, where K is a positive integer greater than or equal to 2. The communication unit 102 is configured to: when a sum of count values of backoff counters of the K first links is less than or equal to 0, or a sum of count values of backoff counters of N second links is less than or equal to 0, send a first PPDU on each second link in the N second links, where the second link is a first link that is in an idle state in a second inter-frame space before a current time point, and N is a positive integer less than or equal to M.

In a possible design, the processing unit 101 is specifically configured to: for each first link in the K first links, wait for an idle period of the first link to reach a second inter-frame space; and after the idle period of the first link reaches the second inter-frame space, each time the first link is in the idle state in one timeslot, decrease a count value of a backoff counter of the first link by 1.

In a possible design, the count value of the backoff counter of the first link includes negative integers.

In a possible design, the processing unit 101 is further configured to: for each first link in the K first links, after the idle period of the first link reaches the second inter-frame space, decrease a count value of a target counter by 1 each time the first link is in the idle state in one timeslot, where the target counter is configured to record a sum of count values of backoff counters of the K first links.

Solution 5

The ML entity supports a plurality of links, and the plurality of links each serve as a first link in turn according to a preset cyclic order. The processing unit 101 is configured to perform a backoff procedure on the first link. The communication unit 102 is configured to: after the backoff procedure of the first link ends, send a first PPDU on each second link in N second links, where the N second links include the first link and N−1 available links, the available link is in the idle state in a first inter-frame space before an end time point of the backoff procedure of the first link, and N is a positive integer.

The ML entity provided in the embodiments of this application may be implemented in a plurality of product forms. In an example, the ML entity may be configured as a general processing system. In another example, the ML entity may be implemented using a general bus architecture. In still another example, the ML entity may be implemented using an application specific integrated circuit (ASIC). The following provides several possible product forms of the ML entity in the embodiments of this application. It should be understood that the following product forms are merely examples, and the possible product forms of the ML entity in the embodiments of this application are not limited.

Figure 15:
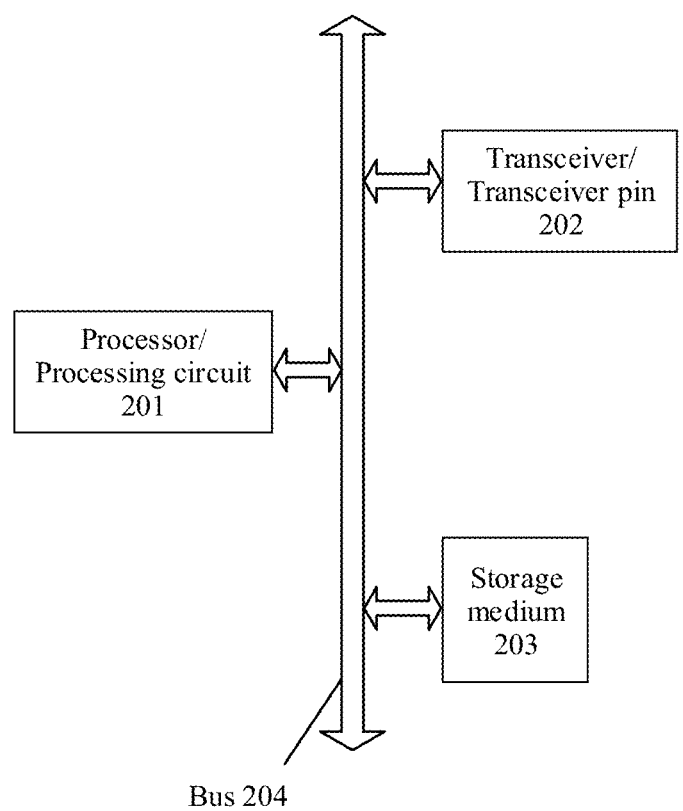
FIG. 15 is a schematic diagram of a structure of an ML entity according to an embodiment of this application.

FIG. 15 is a result diagram of a possible product form of an ML entity according to an embodiment of this application.

In a possible product form, the ML entity in the embodiments of this application may be a communication device, and the communication device includes a processor 201 and a transceiver 202. Optionally, the communication device further includes a storage medium 203.

The processor 201 is configured to perform step S101 in FIG. 5, step S103 in FIG. 6, step S201 in FIG. 9(a), step S301 in FIG. 10, step S401 in FIG. 11(a), step S501 in FIG. 12, and step S601 in FIG. 13. The transceiver 202 is configured to perform step S102 in FIG. 5, step S104 in FIG. 6, step S202 and step S203 in FIG. 9(a), step S204 in FIG. 9(b), step S302 in FIG. 10, step S402 in FIG. 11(a), step S403 in FIG. 11(b), step S502 in FIG. 12, and step S602 in FIG. 13.

In another possible product form, the ML entity in this embodiment of this application may alternatively be implemented by a general-purpose processor or a dedicated processor that is commonly referred to as a chip. The chip includes a processing circuit 201 and a transceiver pin 202. Optionally, the chip may further include a storage medium 203.

The processing circuit 201 is configured to perform step S101 in FIG. 5, step S103 in FIG. 6, step S201 in FIG. 9(a), step S301 in FIG. 10, step S401 in FIG. 11(a), step S501 in FIG. 12, and step S601 in FIG. 13. The transceiver pin 202 is configured to perform step S102 in FIG. 5, step S104 in FIG. 6, step S202 and step S203 in FIG. 9(a), step S204 in FIG. 9(b), step S302 in FIG. 10, step S402 in FIG. 11(a), step S403 in FIG. 11(b), step S502 in FIG. 12, and step S602 in FIG. 13.

An embodiment of this application further provides a computer-readable storage medium, where the computer-readable storage medium stores computer instructions. When the computer-readable storage medium runs on an ML entity, the ML entity performs the method shown in FIG. 5, FIG. 6, FIG. 9(a), FIG. 9(b), FIG. 10, FIG. 11(a), FIG. 11(b), FIG. 12, or FIG. 13. The computer instructions may be stored in the computer-readable storage medium, or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, wireless, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium, a semiconductor medium (for example, a solid-state drive (SSD)), or the like.

An embodiment of this application further provides a computer program product including computer instructions. When the computer program product runs on an ML entity, the ML entity can perform the method shown in FIG. 5, FIG. 6, FIG. 9(a), FIG. 9(b), FIG. 10, FIG. 11(a), FIG. 11(b), FIG. 12, or FIG. 13.

Although this application is described with reference to the embodiments, in a process of implementing this application that claims protection, a person skilled in the art may understand and implement other variations of the disclosed embodiments by viewing the accompanying drawings, disclosed content, and the appended claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, it is clear that various modifications and combinations may be made to them without departing from the spirit and scope of this application. Correspondingly, the specification and accompanying drawings are merely example description of this application defined by the appended claims, and is considered as any of or all modifications, variations, combinations or equivalents that cover the scope of this application. It is clear that a person skilled in the art can make various modifications and variations to this application without departing from the spirit and scope of this application. This application is intended to cover these modifications and variations of this application provided that they fall within the scope of protection defined by the claims of this application and equivalent technologies thereof.

What is claimed is:
1. A method, comprising:
performing, by a station (STA) in a multi-link (ML) entity, a backoff procedure on a first link; and
sending, by the station, a first physical layer protocol data unit (PPDU) on a second link, wherein the second link is the first link whose backoff procedure has ended and that is in an idle state in a first inter-frame space before a first time point,
wherein:
the ML entity supports K first links, the first link is one of the K first links, K is an integer greater than or equal to 2, and a backoff procedure is performed on each first link in the K first links,
the second link is one of N second links, the N second links are a subset of the K first links, and N is a positive integer less than or equal to K, and
the first time point is an end time point of a backoff procedure of a target link, and the target link is a second link whose backoff procedure ends last in the N second links.

2. The method according to claim 1, wherein the STA is an access point (AP), or a non-access point station (non-AP STA).

3. The method according to claim 1, wherein:
the STA in the ML entity is an access point (AP), and the ML entity is an ML AP entity.

4. The method according to claim 1, wherein:
the STA in the ML entity is a non-access point station (non-AP STA), and the ML entity is an ML non-AP STA entity.

5. A station (STA) in a multi-link (ML) entity, the STA comprising a processor configured to perform operations comprising:
performing a backoff procedure on a first link; and
sending a first physical layer protocol data unit (PPDU) on a second link, wherein the second link is the first link whose backoff procedure has ended and that is in an idle state in a first inter-frame space before a first time point,
wherein:
the ML entity supports K first links, and the first link is one of the K first links, K is an integer greater than or equal to 2, and a backoff procedure is performed on each first link in the K first links,
the second link is one of N second links, the N second links are a subset of the K first links, and N is a positive integer less than or equal to K, and
the first time point is an end time point of a backoff procedure of a target link, and the target link is a second link whose backoff procedure ends last in the N second links.

6. The STA according to claim 5, wherein the STA is an access point (AP), or a non-access point station (non-AP STA).

7. The STA according to claim 5, wherein:
the STA in the ML entity is an access point (AP), and the ML entity is an ML AP entity.

8. The STA according to claim 5, wherein:
the STA in the ML entity is a non-access point station (non-AP STA), and the ML entity is an ML non-AP STA entity.

9. A non-transitory computer-readable storage medium, wherein the non-transitory computer-readable storage medium comprises computer instructions; and when the computer instructions are run on a computer, the computer is enabled to perform operations comprising:
performing, a backoff procedure on a first link; and
sending, a first physical layer protocol data unit (PPDU) on a second link, wherein the second link is the first link whose backoff procedure has ended and that is in an idle state in a first inter-frame space before a first time point,
wherein:
an ML entity supports K first links, the first link is one of the K first links, K is an integer greater than or equal to 2, and a backoff procedure is performed on each first link in the K first links,
the second link is one of N second links, the N second links are a subset of the K first links, and N is a positive integer less than or equal to K, and
the first time point is an end time point of a backoff procedure of a target link, and the target link is a second link whose backoff procedure ends last in the N second links.

10. The method according to claim 1, wherein a backoff counter is disposed on each first link of the K first links.

11. The STA according to claim 5, wherein a backoff counter is disposed on each first link of the K first links.

* * * * *